US010533258B2

(12) United States Patent
Aziz et al.

(10) Patent No.: US 10,533,258 B2
(45) Date of Patent: Jan. 14, 2020

(54) METHOD OF MAKING $Co_3O_4$ NANORODS FOR ELECTROCATALYTIC WATER SPLITTING

(71) Applicant: King Fahd University of Petroleum and Minerals, Dhahran (SA)

(72) Inventors: Md. Abdul Aziz, Dhahran (SA); Mohammed Ameen Ahmed Qasem, Dhahran (SA)

(73) Assignee: King Fahd University of Petroleum and Minerals, Dhahran (SA)

(*) Notice: Subject to any disclaimer, the term of this patent is extended or adjusted under 35 U.S.C. 154(b) by 55 days.

(21) Appl. No.: 16/001,579

(22) Filed: Jun. 6, 2018

(65) Prior Publication Data

US 2019/0376195 A1 Dec. 12, 2019

(51) Int. Cl.
| | | |
|---|---|---|
| C25B 11/04 | (2006.01) | |
| C01G 51/04 | (2006.01) | |
| C25B 1/04 | (2006.01) | |
| B82Y 40/00 | (2011.01) | |
| B82Y 30/00 | (2011.01) | |

(52) U.S. Cl.
CPC .......... *C25B 11/0457* (2013.01); *C01G 51/04* (2013.01); *C25B 1/04* (2013.01); *C25B 11/0405* (2013.01); *C25B 11/0415* (2013.01); *B82Y 30/00* (2013.01); *B82Y 40/00* (2013.01); *C01P 2002/72* (2013.01); *C01P 2002/85* (2013.01); *C01P 2002/88* (2013.01); *C01P 2004/03* (2013.01); *C01P 2004/04* (2013.01); *C01P 2004/16* (2013.01); *Y10S 977/762* (2013.01); *Y10S 977/811* (2013.01); *Y10S 977/891* (2013.01); *Y10S 977/932* (2013.01)

(58) Field of Classification Search
None
See application file for complete search history.

(56) References Cited

U.S. PATENT DOCUMENTS

| 2003/0221589 A1 | 12/2003 | Lee et al. |
| 2015/0136614 A1 | 5/2015 | Pattayil et al. |

FOREIGN PATENT DOCUMENTS

| CN | 101486493 B | 2/2011 |
| CN | 101993118 A | 3/2011 |

OTHER PUBLICATIONS

Citation of Preparation of Nano-Co3O4 by Direct Thermal Decomposition of Cobalt(II) Nitrate Hexahydrate for Electrochemical Water Oxidation; Current Nanoscience, vol. 14, No. 2, 2018, pp. 154-159, as being published on Apr. 1, 2018 (Year: 2018).*

(Continued)

*Primary Examiner* — Nicholas A Smith
(74) *Attorney, Agent, or Firm* — Oblon, McClelland, Maier & Neustadt, L.L.P.

(57) ABSTRACT

A method of making $Co_3O_4$ nanorods by thermal decomposition of a cobalt salt is described. A method of using $Co_3O_4$ nanorods as an electrocatalyst component to a porous carbon electrode is also described. The carbon electrode may be made of carbonized filter paper. Together, this carbon-supported $Co_3O_4$ electrode may be used for water electrolysis.

20 Claims, 12 Drawing Sheets

(56) References Cited

OTHER PUBLICATIONS

Patil et al. "Highly sensitive and fast responding CO sensor based on Co3O4 nanorods" Talanta 81 (2010) 37-43) (Year: 2010).*

Sun et al. "Facile and Eco-Friendly Synthesis of Finger-Like Co3O4 nanorods for Electrochemical Energy Storage," Nanomaterials 2015, 5, 2335-2347 (Year: 2015).*

Yuksel Koseoglu, et al., "Magnetic Characterizations of Cobalt Oxide Nanoparticles", Journal of Superconductivity and Novel Magnetism, vol. 25, Issue 8, Sep. 10, 2011, pp. 2783-2787.

Katarina Vojisavljevic, et al., "Nanocrystalline cobalt-oxide powders by solution-combustion synthesis and their application in chemical sensors", Advanced Powder Technology, vol. 28, Issue 4, Apr. 2017, pp. 1118-1128.

Claus Ehrhardt, et al., "Thermal decomposition of cobalt nitrato compounds: Preparation of anhydrous cobalt(II)nitrate and its characterization by Infrared and Raman spectra", Thermochimica Acta, vol. 432, Issue 1, Jul. 1, 2005, pp. 36-40.

M. Th. Makhlouf, et al., "Direct Fabrication of Cobalt Oxide Nanoparticles Employing Sucrose as a Combustion Fuel", Journal of Nanoparticles, vol. 2013, 2013, pp. 1-8.

Saeid Farhadi, et al., "Simple and low-temperature preparation of $Co_3O_4$ sphere-like nanoparticles via solid-state thermolysis of the $[Co(NH_3)6](NO_3)_3$ complex", Materials Research Bulletin, vol. 47, Feb. 25, 2012, pp. 1550-1556.

Yanan Huang, et al., "Synthesis of Cobalt based Complexes and conversion to $Co_3O_4$ nanoparticles as a high performance anode for lithium ion battery", Electrochimica Acta vol. 145, Sep. 2, 2014, pp. 34-39.

Waleed E. Mahmoud, et al., "A novel strategy to synthesize cobalt hydroxide and $Co_3O_4$ nanowires", Journal of Physics and Chemistry of Solids, vol. 72, May 14, 2011, pp. 904-907.

F. Kurtulus, et al., "A Simple Microwave-Assisted Route to Prepare Black Cobalt, $Co_3O_4^1$", Inorganic Materials, vol. 41, No. 5, 2004, pp. 483-485.

Mohammed Ameen Ahmed Qasem, et al., "Preparation of Nano-$Co_3O_4$ by Direct Thermal Decomposition of Cobalt(II) Nitrate Hexahydrate for Electrochemical Water Oxidation", Current Nanoscience, vol. 14, No. 2, 2018, pp. 1-6.

* cited by examiner

METHOD OF MAKING $Co_3O_4$ NANORODS FOR ELECTROCATALYTIC WATER SPLITTING

CROSS-REFERENCE TO RELATED PUBLICATION

The document, Qasem M. A. A., Aziz M. A., Hakeem A. S., and Onaizi, S. A. "Preparation of Nano-$Co_3O_4$ by Direct Thermal Decomposition of Cobalt(II) Nitrate Hexahydrate for Electrochemical Water Oxidation," Current Nanoscience, 14 (2018) 154-159, doi:10.2174/1573413713666171201150215, is herein incorporated by reference in its entirety.

STATEMENT OF ACKNOWLEDGEMENT

This project was prepared with financial support from King Abdulaziz City for Science and Technology (KACST) through the Science & Technology Unit at King Fahd University of Petroleum & Minerals (KFUPM): Project no. 14-ENV332-04, as part of the National Science, Technology and Innovation Plan.

BACKGROUND OF THE INVENTION

Technical Field

The present invention relates to a method of making $Co_3O_4$ nanorods, and a method of using $Co_3O_4$ nanorods as part of a carbon-supported electrode for water electrolysis.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Nano-$Co_3O_4$ (i.e. nanostructures of $Co_3O_4$) has recently attracted the attention of scientists due to its high stability, its anomalous chemical, electrochemical, electronic, magnetic, and catalytic properties, and the relatively high abundance of cobalt in the earth. See X. Wang, X. Wu, B. Xu, T. Hua, *J Solid State Electrochem* 2016, 20, 1303-1309; Y. Teng, L. X. Song, L. B. Wang, J. Xia, *J. Phys. Chem. C* 2014, 118, 4767-4773; S. K. Meher, G. R. Rao, *J. Phys. Chem. C* 2011, 115, 15646-15654; Z. Ma, *Current Catalysis* 2014, 3, 15-26; G. Godillot, L. Guerlou-Demourgues, L. Croguennec, K. M. Shaju, C. Delmas, *J. Phys. Chem. C* 2013, 117, 9065-9075; S. Thota, A. Kumar, J. Kumar, *Materials Science and Engineering B* 2009, 164, 30-37; Z. Chen, C. X. Kronawitter, B. E. Koel, *Phys. Chem. Chem. Phys.* 2015, 17, 29387-29393; W. Jia, M. Guo, Z. Zheng, T. Yu, E. G. Rodriguez, Y. Wang, Y. Lei, *Journal of Electroanalytical Chemistry* 2009, 625, 27-32; C. Guo, X. Zhang, H. Huo, C. Xu, X. Han, *Analyst* 2013, 138, 6727-6731; C. Hou, Q. Xu, L. Yin, X. Hu, *Analyst* 2012, 137, 5803-5808; A. Louardil, A. Rmili, T. Chtouki, B. Elidrissi, H. Erguig, A. El Bachiri, K. Ammous, H. Mejbri, *JMES* 2017, 8, 485-493; J. M. Xu, J. P. Cheng, *Journal of Alloys and Compounds* 2016, 686, 753-768; D. Su, X. Xie, P. Munroe, S. Dou, G. Wang, *Scientific Reports,* 2014, 4: 6519, DOI: 10.1038/srep06519; J. K. Sharma, P. Srivastava, G. Singh, M. S. Akhtar, S. Ameen, *Materials Science and Engineering B* 2015, 193, 181-188; and T. S Kabre, *MS thesis* 2011, Graduate Program in Chemistry, The Ohio State University, each incorporated herein by reference in their entirety. Nano-$Co_3O_4$ have been used in various technological areas and applications such as electrochemical sensors, electrochromic windows, gas sensors, batteries, capacitors, solar cells, fuel cells, electrochemical water splitting and catalysis. See.; W. Jia et al.; C. Guo et al.; C. Hou et al.; A. Louardil et al.; J. M. Xu et al.; D. Su et al.; X. Wang et al.; S. K. Meher et al.; J. K. Sharma et al.; T. S Kabre et al.; M. M. Shahid, A. Pandikumar, A. M. Golsheikh, N. M. Huang, H. N. Lim, *RSC Adv.* 2014, 4, 62793-62801; Z. Chen et al.; Y. Teng et al.; Z. Ma et al.; and J. K. Sharma et al., each incorporated herein by reference in their entirety. Due to its widespread application, several methods have been developed to prepare various types, including various sizes and shapes, of nano-$Co_3O_4$. See X. Wang et al.; Y. Teng et al.; S. K. Meher et al.; S. Thota et al.; Z. Chen et al.; W. Jia et al.; C. Guo et al.; C. Hou et al.; A. Louardil et al.; D. Su et al.; J. K. Sharma et al.; T. S Kabre et al.; M. M. Shahid et al.; S. Hu, C. Melton, D. Mukherjee, *Phys. Chem. Chem. Phys.* 2014, 16, 24034-24044; Yu. V. Shmatok, N. I. Globa, S. A. Kirillov, *Electrochimica Acta* 2017, 245, 88-98; J. Ahmed, T. Ahmad, K. V. Ramanujachary, S. E. Lofland, A. K. Ganguli, *Journal of Colloid and Interface Science* 2008, 321, 434-441; C. R. Bhattacharjee, D. D. Purkayastha, N. Das, *J Sol-Gel Sci Technol* 2013, 65, 296-300; V. Raman, S. Suresh, P. A. Savarimuthu, T. Ramanl, A. M. Tsatsakis, K. S. Golokhvast, V. K. Vadivel, *Experimental and Therapeutic Medicine* 2016, 11, 553-560; K. Assim, S. Schulze, M. Pu"gner, M. Uhlemann, T. Gemming, L. Giebeler, M. Hietschold, T. Lampke, H. Lang, *J Mater Sci* 2017, 52, 6697-6711; A. Khansari, M. Salavati-Niasari, A. K. Babaheydari, *J Clust Sci* 2012, 23, 557-565; M. Salavati-Niasari, A. Khansari, F. Davar, *Inorganica Chimica Acta* 2009, 362, 4937-4942; M. Salavati-Niasari, A. Khansari, *C. R. Chimie* 2014, 17, 352-358; A. Diallo, A. C. Beye, T. B. Doyle, E. Park, M. Maaza, *Green Chemistry Letters and Reviews* 2015, 8, 30-36; R. Xu, H. C. Zeng, *J. Phys. Chem. B* 2003, 107, 12643-12649; S. Farhadi, M. Javanmard, G. Nadri, *Acta Chim. Slov.* 2016, 63, 335-343; S. Farhadi, K. Pourzare, *Materials Research Bulletin* 2012, 47, 1550-1556; Z. H. Ibupoto, S. Elhag, M. S. AlSalhi, O. Nur, M. Willander, *Dalton Trans.* 2016, 45, 10842-10849; Y. Huang, C. Chen, C. An, C. Xu, Y. Xu, Y. Wang, L. Jiao, H. Yuan, *Electrochimica Acta* 2014, 145, 34-39; K. Kalpanadevi, C. R. Sinduja, R. Manimekalai, *Australian Journal of Chemistry* 2014, 67, 1671-1674; S. Harish, K. Silambarasan, G. Kalaiyarasan, A. V. N. Kumar, J. Joseph, *Materials Letters* 2016, 165, 115-118; W. E. Mahmoud, F. A. Al-Agel, *Journal of Physics and Chemistry of Solids* 2011, 72, 904-907; J. Pu, J. Wan, Y. Wang, Y. Ma, *RSC Adv.* 2016, 6, 91791-91797; and R. K. Gupta, A. K. Sinha, B. N. R. Sekhar, A. K. Srivastava, G. Singh, S. K. Deb, *Appl Phys A* 2011, 103, 13-19, each incorporated herein by reference in their entirety. Even though many efforts have been expended to prepare nano-$Co_3O_4$, the development of novel methods to prepare $Co_3O_4$ using simple processes at low cost remains a topic of interest.

Of the above-mentioned preparation methods, thermal decomposition is particularly advantageous in yielding phase-pure nano-$Co_3O_4$ and for its easy scale-up. Generally, the thermal decomposition method, when used for producing nano-$Co_3O_4$, requires a suitable cobalt precursor such as cobalt oxalate, cobalt(II)-tartrate complex, cobalt citrate, cobalt ethylene glycol carboxylates, N-N-bis(salicylaldehyde)-1,2-phenylenediimino cobalt(II), [bis(salicylaldehydeato)cobalt(II)], [bis(salicylaldehyde)ethylenediimine-cobalt(II)], cobalt in complex with plant extract, cobalt hydroxyl carbonates, pentamminecobalt(III) complex, hexamminecobalt(III) nitrate complex, cobalt bis (4-pyridine carboxylate) tetrahydrate, Co(cinnamate)$_2$(N$_2$H$_4$)$_2$, Co$_3$[Co(CN)$_6$]$_2$, cobalt hydroxide, or a Co-based metal organic framework. See J. Ahmed et al.; C. R. Bhattacharjee et al.; V. Raman et al.; K. Assim et al.; A. Khansari et al.; M. Salavati-Niasari., A. Khansari, F. Davar, *Inorganica Chimica Acta* 2009, 362, 4937-4942; M. Salavati-Niasari, A. Khansari, *C. R. Chimie* 2014, 17, 352-358; A. Diallo et al.; R. Xu et al.; S. Farhadi, M. Javanmard, G. Nadri, *Acta Chim. Slov.* 2016, 63, 335-343; S. Farhadi, K. Pourzare, *Materials Research Bulletin* 2012, 47, 1550-1556; Y. Huang et al.; K. Kalpanadevi et al.; S. Harish et al.; W. E. Mahmoud et al.; and J. Pu et al., each incorporated herein by reference in their entirety. However, these precursors themselves need to be prepared with tedious reactions between common inorganic salts like CoCl$_2$.6H$_2$O or Co(NO$_3$)$_2$.6H$_2$O, and organic or inorganic molecules in solvents, and carrying out these reactions is time consuming and increases the overall cost of the final nano-Co$_3$O$_4$ product. Also note that, solvothermally prepared amorphous CoO$_x$ from Co(NO$_3$)$_2$.6H$_2$O can be converted to Co$_3$O$_4$ upon thermal decomposition at various temperatures. See R. K. Gupta et al., incorporated herein by reference in its entirety. In addition, Yan et al. reported the preparation of nano-Co$_3$O$_4$ by a thermal decomposition of Co(NO$_3$)$_2$.6H$_2$O-loaded g-C$_3$N$_4$, which was prepared by the mixing of Co(NO$_3$)$_2$.6H$_2$O and g-C$_3$N$_4$ in ethanol under stirring followed by the evaporation of the ethanol. See H. Yan, X. Xie, K. Liu, H. Cao, X. Zhang, Y. Luo, *Powder Technology* 2012, 221, 199-202, incorporated herein by reference in its entirety. It would be advantageous in terms of simplicity, rapidity, and low cost to be able to prepare pure nano-Co$_3$O$_4$ by a direct thermal decomposition of an inexpensive and widely available cobalt inorganic precursor such as Co(NO$_3$)$_2$.6H$_2$O or CoCl$_2$.6H$_2$O without any type of pre-reaction or processing. Though it has been reported that Co(NO$_3$)$_2$.6H$_2$O can be decomposed to cobalt oxide, there has been no report of the preparation of pure nano-Co$_3$O$_4$ by a direct thermal decomposition of Co(NO$_3$)$_2$.6H$_2$O without any preprocessing or pre-reaction. See . D. ivković, D. T. ivković, D. B. Grujičič, *Journal of Thermal Analysis and calorimetry* 1998, 53, 617-623, incorporated herein by reference in its entirety.

In view of the foregoing, one objective of the present invention is to provide a method for making Co$_3$O$_4$ nanorods. The Co$_3$O$_4$ nanorods may be deposited on a carbonized paper electrode and used in an electrochemical cell for water electrolysis.

BRIEF SUMMARY OF THE INVENTION

According to a first aspect, the present disclosure relates to a method for making Co$_3$O$_4$ nanorods. The method involves heating at least one of Co(NO$_3$)$_2$ and Co(NO$_3$)$_2$.6H$_2$O in air for 1-6 h at a temperature of 420-700° C. to produce Co$_3$O$_4$ nanorods by thermal decomposition. The Co$_3$O$_4$ nanorods have an average diameter of 10-70 nm and an average length of 20-100 nm.

In one embodiment, the cobalt of the cobalt salt consists essentially of cobalt having a +2 oxidation state.

In one embodiment, the Co$_3$O$_4$ nanorods have an average aspect ratio of 1.05:1-3.0:1.

In one embodiment, the Co$_3$O$_4$ nanorods have a crystalline morphology.

In one embodiment, at least 70% of the Co$_3$O$_4$ nanorods have an average diameter of 25-60 nm.

In one embodiment, the cobalt salt is Co(NO$_3$)$_2$.6H$_2$O.

According to a second aspect, the present disclosure relates to a carbon-supported Co$_3$O$_4$ electrode, comprising carbonized paper and Co$_3$O$_4$ nanorods having an average diameter of 10-70 nm and an average length of 20-100 nm deposited on the carbonized paper. The carbon-supported Co$_3$O$_4$ electrode is substantially free of Co$^0$.

In one embodiment, the Co$_3$O$_4$ nanorods consist essentially of Co$_3$O$_4$.

In one embodiment, a surface density of the Co$_3$O$_4$ nanorods on the carbonized paper is 100-200 μg/cm$^2$.

In one embodiment, the Co$_3$O$_4$ nanorods are aggregated into clusters having diameters of 1-20 μm.

In one embodiment, the clusters have a nearest neighbor distance of 500 nm-20 μm.

In one embodiment, the Co$_3$O$_4$ nanorods are made by heating a cobalt salt in air for 1-6 h at a temperature of 420-700° C. to produce Co$_3$O$_4$ nanorods by thermal decomposition.

In one embodiment, the carbonized paper is made by heating a paper at 700-950° C. for 1-12 h in an inert atmosphere.

In a further embodiment, the paper is a filter paper.

According to a third aspect, the present disclosure relates to an electrochemical cell, comprising the carbon-supported Co$_3$O$_4$ electrode of the second aspect, a counter electrode, and an electrolyte solution in contact with both electrodes.

In one embodiment, the electrochemical cell further comprises a reference electrode in contact with the electrolyte solution.

In one embodiment, the electrolyte solution comprises water and an inorganic base at a concentration of 0.05-0.4 M.

In one embodiment, the carbon-supported Co$_3$O$_4$ electrode has a current density of 30-45 mA/cm$^2$ when the electrodes are subjected to a potential of 1.3-1.8 V.

According to a fourth aspect, the present disclosure relates to a method for decomposing water into H$_2$ and O$_2$. The method involves subjecting the electrodes of the electrochemical cell of the third aspect with a potential of 0.5-2.0 V.

In one embodiment, the method further involves separately collecting H$_2$-enriched gas and O$_2$-enriched gas.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
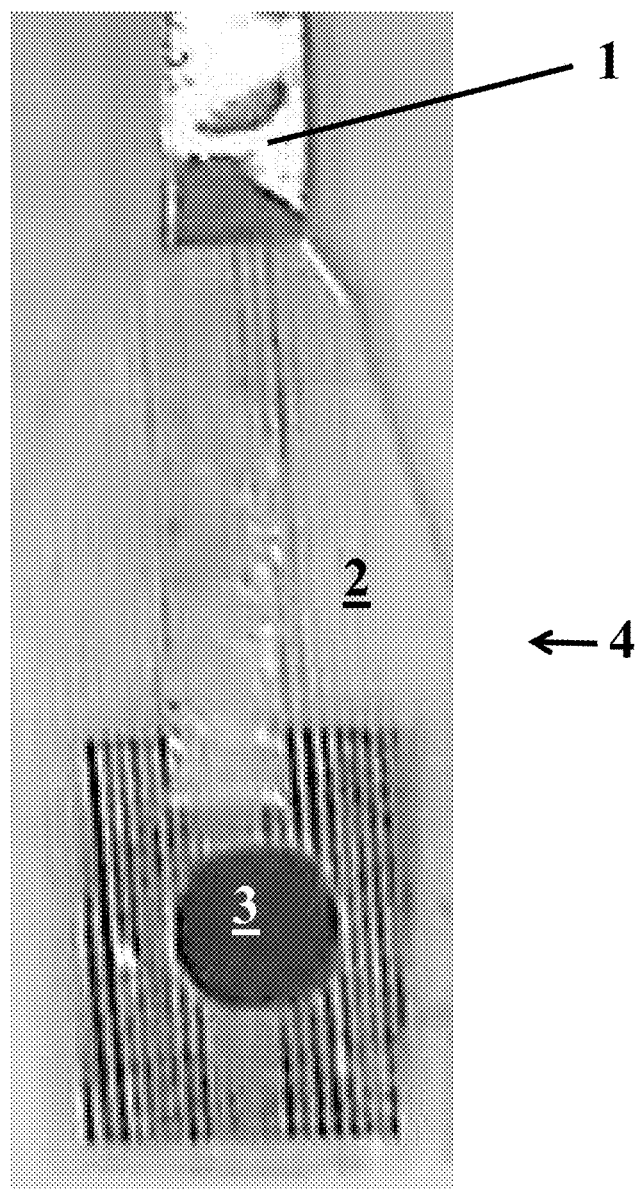
FIG. 1 is an electrode assembly comprising the carbon-supported Co$_3$O$_4$ electrode.

Embodiments of the present disclosure will now be described more fully hereinafter with reference to the accompanying drawings, in which some, but not all embodiments of the disclosure are shown.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise. Also, all values and subranges within a numerical limit or range are specifically included as if explicitly written out.

As used herein, "compound" is intended to refer to a chemical entity, whether as a solid, liquid, or gas, and whether in a crude mixture or isolated and purified.

As used herein, "composite" refers to a combination of two or more distinct constituent materials into one. The individual components, on an atomic level, remain separate and distinct within the finished structure. The materials may have different physical or chemical properties, that when combined, produce a material with characteristics different from the original components. In some embodiments, a composite may have at least two constituent materials that comprise the same empirical formula but are distinguished by different densities, crystal phases, or a lack of a crystal phase (i.e. an amorphous phase).

The present disclosure is intended to include all hydration states of a given compound or formula, unless otherwise noted or when heating a material. For example, $Co(NO_3)_2$ or $Co(NO_3)_2 \cdot 6H_2O$ includes anhydrous $Co(NO_3)_2$, $Co(NO_3)_2 \cdot 6H_2O$, and any other hydrated forms or mixtures. $CuCl_2$ includes both anhydrous $CuCl_2$ and $CuCl_2 \cdot 2H_2O$.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium. Isotopes of carbon include $^{13}C$ and $^{14}C$. Isotopes of nitrogen include $^{14}N$ and $^{15}N$. Isotopes of oxygen include $^{16}O$, $^{17}O$, and $^{18}O$. Isotopes of cobalt include $^{59}Co$ and $^{60}Co$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

As used herein, "particle size" and "pore size" may be thought of as the lengths or longest dimensions of a particle and of a pore opening, respectively.

For polygonal shapes, the term "length," as used herein, and unless otherwise specified, refers to the greatest possible distance measured from a vertex of a polygon through the center of the face to the vertex on the opposite side. For a circle, an oval, and an ellipse, "length" refers to the greatest possible distance measured from one point on the shape through the center of the shape to a point directly across from it. The term "width" as used herein, and unless otherwise specified, refers to the greatest possible distance perpendicular to the length. "Diameter" may be thought of as width.

As used herein, the words "about," "approximately," or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

According to a first aspect, the present disclosure relates to a method for making $Co_3O_4$ nanorods that have an average diameter of 10-70 nm and an average length of 20-100 nm. The method involves heating a cobalt salt in air to produce $Co_3O_4$ nanorods by thermal decomposition.

$Co_3O_4$ is the formula representing the inorganic compound cobalt(II,III) oxide. The compound may also be called cobalt(II) dicobalt(III) oxide, or tricobalt tetroxide. As a mixed valence compound, its formula may also be represented as $Co^{II}Co^{III}_2O_4$ or $CoO \cdot Co_2O_3$.

The $Co_3O_4$ nanorods of the present disclosure may be considered as a type of nanoparticle. Nanoparticles are particles between 1 and 100 nm ($10^2$ to $10^7$ atoms) in size. A particle is defined as a small object that behaves as a whole unit with respect to its transport and properties. The exceptionally high surface area to volume ratio of nanoparticles may cause the nanoparticles to exhibit significantly different or even novel properties from those observed in individual atoms/molecules, fine particles and/or bulk materials. Nanoparticles may be classified according to their dimensions. Three-dimensional nanoparticles preferably have all dimensions of less than 100 nm, and generally encompass isodimensional nanoparticles. Examples of three dimensional nanoparticles include, but are not limited to nanoparticles, nanospheres, nanogranules, and nanobeads. Two-dimensional nanoparticles have one dimension of less than 100 nm, generally including thickness. Examples of two-dimensional nanoparticles include, but are not limited to, nanosheets, nanoplatelets, nanolaminas, and nanoshells. One-dimensional nanoparticles have two dimensions of less than 100 nm, generally including width or diameter. Examples of one-dimensional nanoparticles include, but are not limited to, nanotubes, nanofibers, and nanowhiskers. The $Co_3O_4$ nanorods of the present disclosure preferably are one-dimensional nanoparticles but may also be one-dimensional, two-dimensional, three-dimensional, or mixtures thereof. In an alternative embodiment, $Co_3O_4$ nanorods having one or more dimensions greater than 100 nm may be used in in the present disclosure.

In one embodiment, the $Co_3O_4$ nanorods of the present disclosure are cylindrical, elongated, pill-shaped, ovoid, ellipsoidal, rounded, and/or spherical. In another embodiment, the $Co_3O_4$ nanorods may be cubic, rectangular, prismatic, octahedral, or hexagonal. In one embodiment, the $Co_3O_4$ nanorods may have a combination of planar sides with rounded edges or corners. In another embodiment, the $Co_3O_4$ nanorods may be considered more cubic and prismatic than rounded and spherical. Preferably the $Co_3O_4$ nanorods are solid and non-porous, however, hollow and/or porous $Co_3O_4$ nanorods may be used in the present disclosure. In an alternative embodiment, the $Co_3O_4$ nanorods may be considered to be nanoparticles or nanostructures of different morphologies and shapes than those previously listed. For instance, and without limitation, the $Co_3O_4$ may be made in the form of nanowires, nanocrystals, nanorectangles, nanotriangles, nanopentagons, nanohexagons, nanoprisms, nanodisks, nanocubes, nanoribbons, nanoblocks, nanobeads, nanotoroids, nanodiscs, nanobarrels, nanogranules, nanowhiskers, nanoflakes, nanofoils, nanopowders, nanoboxes, nanostars, tetrapods, nanobelts, nano-urchins, nanofloweres, etc. and mixtures thereof. The above-mentioned morphologies sometimes arise spontaneously as an effect of the synthesis or from the innate crystallographic growth patterns of the materials themselves. Some of these morphologies may serve a purpose, such as bridging an electrical junction or providing a high surface area for electrocatalysis in a solution.

In one embodiment, the $Co_3O_4$ nanorods consist essentially of $Co_3O_4$. As defined here, the $Co_3O_4$ nanorods "consisting essentially of $Co_3O_4$" means that the $Co_3O_4$ nanorods comprise at least 95 wt % $Co_3O_4$, preferably at least 99 wt % $Co_3O_4$, more preferably at least 99.5 wt % $Co_3O_4$, even more preferably at least 99.9 wt % $Co_3O_4$, or about 100 wt % $Co_3O_4$, relative to a total weight of the $Co_3O_4$ nanorods. In one embodiment, the $Co_3O_4$ nanorods may comprise less than 100 wt % $Co_3O_4$, and may further comprise $Co^0$, $Co_2O_3$ (cobalt(III) oxide), $Co_2O$ (cobalt(II) oxide) or other metals or compounds. In one embodiment, the $Co_3O_4$ nanorods may be intentionally doped with metals such as $Co^0$, Ni, Fe, Zn, or some other metal. In this embodiment, the doped $Co_3O_4$ nanorods may comprise 0.1-60 wt %, preferably 5-50 wt %, more preferably 10-30 wt % of one or more other metals relative to a total weight of the doped $Co_3O_4$ nanorods.

In one embodiment, the $Co_3O_4$ nanorods have a crystalline morphology. Having a crystalline morphology means that the $Co_3O_4$ nanorods comprise at least 90 wt %, preferably at least 95 wt %, more preferably at least 99 wt % crystalline $Co_3O_4$ relative to a total weight of the $Co_3O_4$. This means that the crystalline $Co_3O_4$ has an isometric or cubic crystal system. Crystalline $Co_3O_4$ adopts a normal spinel structure, with $Co^{2+}$ ions located in tetrahedral interstices and $Co^{3+}$ ions in the octahedral interstices of the cubic close-packed lattice of oxide anions. In one embodiment, where the $Co_3O_4$ nanorods comprise less than 100 wt % crystalline $Co_3O_4$ relative to a total weight of the $Co_3O_4$, the $Co_3O_4$ that is not crystalline $Co_3O_4$ may be amorphous $Co_3O_4$.

In one embodiment, the $Co_3O_4$ nanorods have an average diameter of 10-70 nm, preferably 20-60 nm, more preferably 22-40 nm, even more preferably 25-35 nm, and an average length of 20-100 nm, preferably 25-95 nm, more preferably 35-85 nm, even more preferably 50-80 nm. However, in some embodiments, the $Co_3O_4$ nanorods may have an average diameter of less than 10 nm or greater than 70 nm, and/or an average length of less than 20 nm or greater than 100 nm.

In one embodiment, $Co_3O_4$ nanorods may be considered to be polydisperse. Dispersity is a measure of the heterogeneity of sizes of molecules or particles in a mixture. In probability theory and statistics, the coefficient of variation (CV), also known as relative standard deviation (RSD) is a standardized measure of dispersion of a probability distribution. It is expressed as a percentage and is defined as the ratio of the standard deviation ($\sigma$) of to the mean ($\mu$, or its absolute value, $|\mu|$). The CV or RSD is widely used to express precision and repeatability. It shows the extent of variability in relation to the mean of a population. As used herein, "polydisperse" refers to $Co_3O_4$ nanorods having a CV or RSD of length and/or width of greater than 20%, preferably greater than 25%. In an alternative embodiment, the $Co_3O_4$ nanorods are monodisperse, meaning that the $Co_3O_4$ nanorods have a CV or RSD of length and/or width of less than 20%, preferably less than 15%, more preferably less than 10%. In some embodiments, the $Co_3O_4$ nanorods may be considered both polydisperse and monodisperse, for instance, the $Co_3O_4$ nanorods may have a monodisperse width and a polydisperse length. In other words, the $Co_3O_4$ nanorods may have great variations in length but small variations in diameter.

In one embodiment, at least 70% of the $Co_3O_4$ nanorods have an average diameter of 25-60 nm, preferably 25-50 nm. In another embodiment, at least 80%, preferably at least 85% of the $Co_3O_4$ nanorods have an average diameter of 25-60 nm, preferably 25-50 nm, even more preferably 25-40 nm. However, in some embodiments, less than 70% of the $Co_3O_4$ nanorods have an average diameter of 25-60 nm. For instance, only 40-45%, 45-50%, 50-55%, 55-60%, 60-65%, or 65-69% of the $Co_3O_4$ nanorods have an average diameter of 25-60 nm. In another embodiment, 5-30%, preferably 6-10% of the $Co_3O_4$ nanorods have a diameter of less than 25 nm. In another embodiment, 5-40%, preferably 6-30%, more preferably 7-20%, even more preferably 7-12% of the $Co_3O_4$ nanorods have a diameter greater than 60 nm. In another embodiment, the $Co_3O_4$ nanorods may have lengths and/or widths ranging from 5-600 nm, preferably 10-500 nm, more preferably 20-400 nm, even more preferably 20-150 nm. The above particle size ranges and distributions may be determined by TEM, SEM, dynamic light scattering (DLS), a particle size analyzer, or some other method or instrument.

In one embodiment, the $Co_3O_4$ nanorods have an average aspect ratio of 1.05:1-3.0:1, preferably 1.10:1-2.0:1, more preferably 1.25:1-1.8:1. However, in some embodiments, the aspect ratio may be greater than 3.0:1 or less than 1.05:1. As described here, the aspect ratio is the ratio of a nanoparticle's length to its width. For example and without limitation, a perfect sphere and a perfect cube have an aspect ratio of 1:1. A rectangular prism that is not a cube would have an aspect ratio larger than 1:1.

In one embodiment, the $Co_3O_4$ nanorods may have a band gap energy of 2.07-3.80 eV, preferably 2.20-3.70 eV, more preferably 2.5-3.20 eV, though in some embodiments, the band gap energy may be less than 2.07 eV or greater than 3.80 eV.

The method of making the $Co_3O_4$ nanorods involves heating a cobalt salt in air to produce $Co_3O_4$ nanorods by thermal decomposition. In one embodiment, the cobalt salt is $Co(NO_3)_2$, $CoCl_2$, $CoBr_2$, $CoI_e$, $CoF_2$, $CoS$, $CoSO_4$, cobalt(II) acetate, tris(ethylenediamine)cobalt(III) chloride ($[Co(en)_3]Cl_3$), $[Co(NH_3)_6]Cl_3$, tris(triphenylphosphine)cobalt(I) chloride (($(P(C_6H_5)_3)_3CoCl$)), $Co_2O_3$ (cobalt(III) oxide), $Co_2O$ (cobalt(II) oxide), $CoFe_2O_4$, or some other cobalt salt or cobalt-containing compound. Preferably the cobalt has a +2 oxidation state, though in an alternative embodiment, cobalt having a different oxidation state, such as +3, may be used. In a related alternative embodiment, cobalt metal)($Co^0$) may be heated. In another alternative embodiment, a naturally-occurring mineral of cobalt may be heated, for example, glaucodot (i.e., (Co,Fe)AsS). In one embodiment, the cobalt of the cobalt salt consists essentially of cobalt in a +2 oxidation state. As defined here, the cobalt "consisting essentially of cobalt in a +2 oxidation state" means that at least 95 wt %, preferably at least 99 wt %, more preferably at least 99.5 wt % of the cobalt has a +2 oxidation state, relative to a total weight of the cobalt. In another embodiment, CoO and/or $Co_2O_3$ may be heated. Preferably, the cobalt salt may be in any hydration state, for instance, $Co(NO_3)_2$ includes both $Co(NO_3)_2$ and $Co(NO_3)_2.6H_2O$. In a preferred embodiment, the cobalt salt is $Co(NO_3)_2.6H_2O$. The cobalt salt may have an average particle size of 1-800 µm, preferably 5-400 µm, more preferably 10-100 µm, though in another embodiment, larger particles or clumps of cobalt salt may be used. In one embodiment, the cobalt salt may be ball-milled, ground, or crushed to decrease an average particle size. In another embodiment, the cobalt salt of one particle size may be dissolved in a solvent, such as water, and then the water may be evaporated to leave solid cobalt salt of another particle size. In a further embodiment, the cobalt salt may be dissolved in a solvent with a chelating agent, and then dried with the chelating agent.

In alternative embodiments, metal salts may be used other than Co to produce metal oxide nanoparticles other than cobalt oxides. For example, and without limitation, these metal salts may be $Cu(NO_3)_2$, $CuCl_2$, $CuSO_4$, $CdCl_2$, $Ni(NO_3)_2$, $Mn(NO_3)_2$, $Zr(NO_3)_2$, or $Zn(NO_3)_2$. Additional metal salts, comprising Co or some other metal, may be used in the method. For example, such conventional salts include those derived from inorganic acids such as hydrochloric, hydrobromic, sulfuric, sulfamic, phosphoric, and nitric; and the salts prepared from organic acids such as acetic, propionic, succinic, glycolic, stearic, lactic, malic, tartaric, citric, ascorbic, pamoic, maleic, hydroxymaleic, phenylacetic, glutamic, benzoic, salicylic, sulfanilic, 2-acetoxybenzoic, fumaric, toluenesulfonic, methanesulfonic, ethane disulfonic, oxalic, and isethionic, and the like.

The cobalt salt may be heated in air within a furnace or oven at a temperature of 420-700° C., preferably 450-650° C., more preferably 500-550° C., though in some embodiments, the cobalt salt may be heated at a temperature of lower than 420° C. or higher than 700° C. Also, in some embodiments, the cobalt salt may not be heated in air, but oxygen-enriched air, an inert gas, or a vacuum. Preferably the cobalt salt is placed in an oven at room temperature or 20-50° C., and then the temperature is increased to the target heating temperature at a rate of 5-15° C./min, preferably 8-12° C./min. The cobalt salt may be maintained at a peak temperature for 1-6 h, preferably 2-5 h, or about 3 h. Heating the cobalt salt produces the $Co_3O_4$ nanorods, which may be cooled at a rate of 3-12° C./min, or about 5° C./min until reaching room temperature.

According to a second aspect, the present disclosure relates to a carbon-supported $Co_3O_4$ electrode, comprising carbonized paper and $Co_3O_4$ nanorods deposited on the carbonized paper. In one embodiment, the carbon-supported $Co_3O_4$ electrode may be considered an electrocatalyst, though in another embodiment, just the $Co_3O_4$ nanorods of the carbon-supported $Co_3O_4$ electrode may be considered the electrocatalyst.

In one embodiment, the $Co_3O_4$ nanorods of the carbon-supported $Co_3O_4$ electrode are made by the method of the first aspect of the disclosure. Thus, the $Co_3O_4$ nanorods may have sizes, dimensions, and properties as those previously mentioned. Alternatively, the $Co_3O_4$ nanorods may be made by a sol-gel process, solvent-free thermal synthesis, co-precipitation, oxidation-reduction, microwave-assisted hydrothermal synthesis, electrospinning, or some other process. In another alternative embodiment, $Co_3O_4$ nanorods may be derived from naturally-occurring cobalt-containing minerals. In one embodiment, $Co_3O_4$ nanorods may be formed or deposited on the carbonized paper by electrodeposition or thermal evaporation. In one embodiment, the $Co_3O_4$ nanorods of the carbon-supported $Co_3O_4$ electrode may have one or more properties or characteristics different than $Co_3O_4$ nanorods made by the method of the first aspect of the disclosure.

Additionally, in one embodiment, the carbon-supported $Co_3O_4$ electrode is substantially free of $Co^0$. As defined here, the carbon-supported $Co_3O_4$ electrode being "substantially free of $Co^0$" means that the carbon-supported $Co_3O_4$ electrode comprises less than 2 wt % $Co^0$, preferably less than 0.5 wt % $Co^0$, more preferably less than 0.1 wt % $Co^0$, relative to a total weight of the $Co_3O_4$. In an alternative embodiment, however, the carbon-supported $Co_3O_4$ electrode may comprise $Co^0$, for instance, at a weight percentage of 20-80 wt %, more preferably 30-50 wt %, relative to a total weight of the combined $Co_3O_4$ and $Co^0$.

In one embodiment, a density of the $Co_3O_4$ nanorods on the carbonized paper is 100-200 µg/cm², preferably 110-190 µg/cm², more preferably 130-170 µg/cm², or about 150 µg/cm². However, in some embodiments, the density of the $Co_3O_4$ nanorods may be less than 100 µg/cm² or greater than 200 µg/cm².

In one embodiment, the $Co_3O_4$ nanorods are aggregated into clusters having diameters of 1-20 µm, preferably 2-16 µm, more preferably 6-10 µm. However, in other embodiments, the $Co_3O_4$ nanorods may be aggregated into clusters having diameters of less than 1 µm or greater than 20 µm.

In one embodiment, the clusters have a nearest neighbor distance of 500 nm-20 µm, preferably 750 nm-15 µm, more preferably 1 µm-10 µm. However, in other embodiments, the $Co_3O_4$ nanorods may have a nearest neighbor distance of less than 500 nm or greater than 10 µm.

Carbonized paper may be referred to as pyrolyzed paper, and may be made by subjecting paper, such as paper tissue, newsprint, lens paper, construction paper, manila paper, wax paper, parchment paper, kraft paper, filter paper, printer paper, notebook paper, cardstock, cardboard, or some other paper or paper fiber product to pyrolysis. Preferably the paper is filter paper, such as WHATMAN Cellulose Filter Paper, a paper coffee filter, or a paper air filter. The paper may comprise fibers from wood, hemp, linen, cotton, banana, rice, or other sources including cellulose from bacteria or fungi. Pyrolysis is a thermal decomposition of materials at elevated temperatures (such as temperatures of 300° C. or greater, preferably 400° C. or greater, more preferably 500° C. or greater) in an inert atmosphere such as or nitrogen gas, or in a vacuum. Pyrolysis is most commonly applied to the treatment of organic materials. In general, pyrolysis of organic substances produces volatile products and leaves a solid residue enriched in carbon. "Carbonization" may be considered as a pyrolysis treatment that leaves mostly carbon as the residue, for example, at least 95 wt % carbon or at least 99 wt % carbon, relative to a total weight of the pyrolyzed item.

In one embodiment, the carbonized paper may be formed by heating paper, preferably filter paper, at a temperature of 700-950° C., preferably 750-900° C., more preferably 800-875° C., for 1-12 h, preferably 3-10 h, more preferably 4-8 h, in an atmosphere consisting essentially of inert gas. However, in some embodiments, the paper may be heated at temperatures of lower than 700° C. or greater than 950° C., and/or times shorter than 1 h or longer than 12 h. Preferably, the paper is not immediately transferred from a room temperature environment to a heated environment of 700-950° C., but rather, the paper may be placed in an oven or crucible at room temperature, and then heated at a rate of 4-15° C./min, preferably 5-13° C./min, more preferably 8-11° C./min, or about 10° C./min. However, in some embodiments, the oven or crucible may start at a temperature warmer than room temperature, and/or may be heated at a rate slower than 4° C./min or faster than 15° C./min. Likewise, following the heating, the carbonized paper is preferably cooled to room temperature at a rate of 2-15° C./min, preferably 3-10° C./min, more preferably 4-8° C./min, or about 5° C./min, though in some embodiments, the carbonized paper may be cooled at a rate slower than 2° C./min or faster than 15° C./min.

The "atmosphere consisting essentially of inert gas" means that the space where the paper is heated comprises at least 99.5 vol % inert gas, preferably at least 99.9 vol % inert gas, more preferably at least 99.95 vol % inert gas, relative to the total volume of the space. The inert gas may be nitrogen gas, argon gas, or some other inert gas. Preferably the inert gas is nitrogen gas.

In one embodiment, before the heating, the paper may be cut into pieces having areas of 1-10 cm$^2$, preferably 2-8 cm$^2$, more preferably 3-6 cm$^2$. The paper may be placed in a crucible, such as an alumina crucible, and heated in a tubular furnace, or some other furnace, kiln, or oven. In alternative embodiments, a carbon-rich flat substrate may instead be used to produce a porous, carbonized surface for the $Co_3O_4$ nanorods. This carbon-rich substrate may be a plastic film, a woven plastic fiber, plastic foam, starch, a fabric, a piece of wood, a leaf, a fruit or vegetable peel, or a flour wafer. In another alternative embodiment, a porous, heat-resistant material, such as glass wool, may be coated with starch or some other carbon-rich material, and then carbonized. In another alternative embodiment, the paper may be fixed or confined against one or more flat surfaces in order to maintain its shape while being heated.

In one embodiment, the carbonized paper or other carbonized material, preferably carbonized cellulose, may have a surface area of 50-700 m$^2$/g, preferably 80-500 m$^2$/g, more preferably 100-300 m$^2$/g. Though in some embodiments, the surface area may be smaller than 50 m$^2$/g or greater than 700 m$^2$/g. The carbonized paper or other carbonized material may have a sheet resistance of 0.1-15Ω/sq, preferably 0.5-12Ω/sq, more preferably 3-8Ω/sq, though in some embodiments, the sheet resistance may be smaller than 0.1Ω/sq or greater than 15Ω/sq.

Figure 4A:
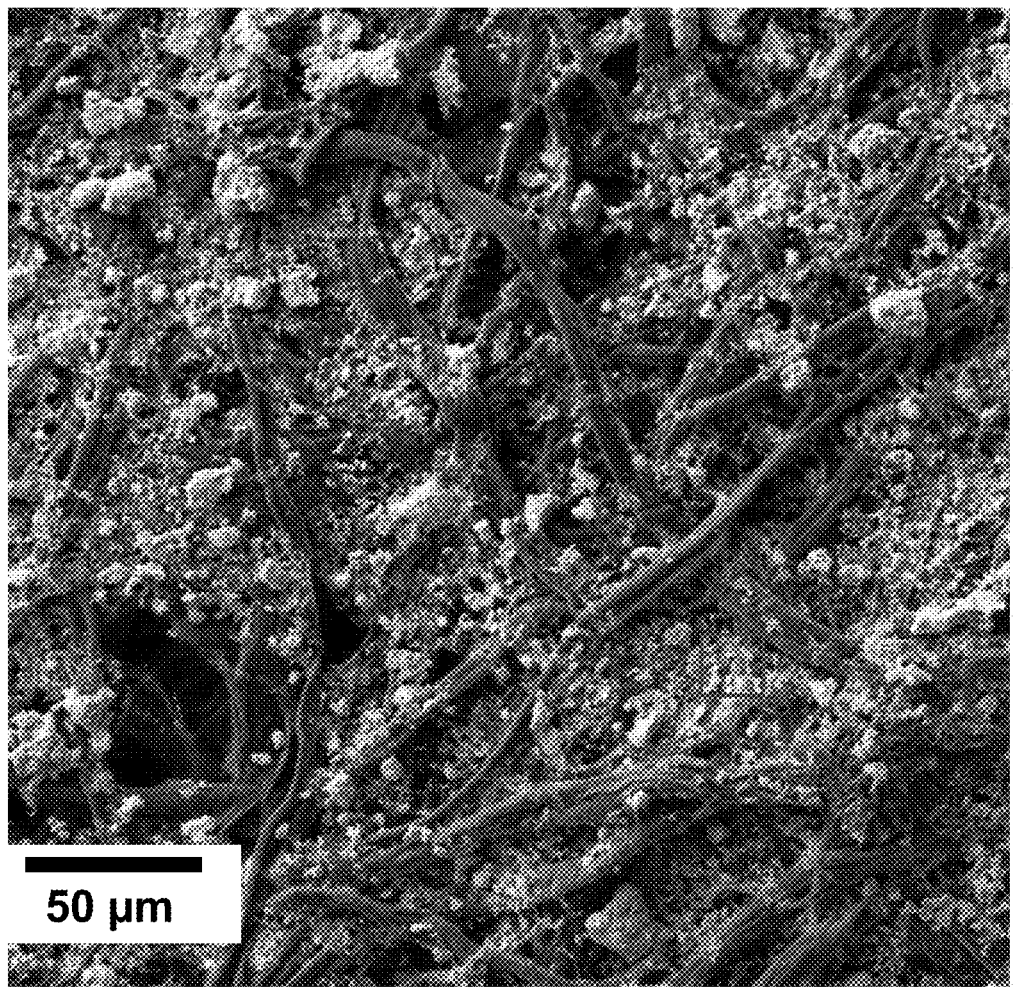
FIG. 4A is a FESEM image of a carbon-supported $Co_3O_4$ electrode.

In one embodiment, carbonized paper may comprise microfibers having diameters of 2-15 μm, preferably 3-10 μm, as shown in FIG. 4A, however, depending on the type of paper used, the carbonized paper may comprise microfibers having diameters greater than 15 μm or smaller than 2 μm.

Following the carbonization, the carbonized paper may be used to make an electrode assembly. Preferably the electrode assembly serves the purposes of providing structural stability to the carbonized paper in an electrolyte solution, while also providing an electrical connection to both the electrolyte solution and the voltage source (such as a potentiostat). This enables a complete circuit in the electrochemical cell. Preferably the carbonized paper may be fixed or adhered to a substrate, such as a glass slide, a plastic film, a plastic sheet, or adhesive tape configured to leave an area exposed and in contact with an electrolyte solution. This area may be considered the filter paper carbonized electrode, or FPCE. In one embodiment, the area may be 0.10-1.00 cm$^2$, preferably 0.15-0.50 cm$^2$ or about 0.2 cm$^2$, however, in some embodiments, the area may be smaller than 0.10 cm$^2$ or greater than 1.00 cm$^2$. An electrical connection may be made by attaching an electrically conductive material, such as aluminum, copper, silver, or steel, in the form of a wire, ribbon, or sheet, to a part of the carbonized paper. The electrically conductive material may then be electrically connected to the voltage source or potentiostat of the electrochemical cell, and preferably this electrically conductive material is insulated from the electrolyte solution. FIG. 1 shows an embodiment of an electrode assembly 4 where a rectangular piece of carbonized paper is attached to a copper tape 1, and both are sandwiched between two pieces of plastic tape 2 (i.e. SCOTCH tape). A hole in one piece of the plastic tape is configured to expose a region 3 of the carbonized paper to the electrolyte solution, while the copper tape stays insulated from the electrolyte solution and provides a connection to the voltage source.

In an alternative embodiment, the carbonized paper may be fit into a frame or a perforated sleeve, so that both sides of a single piece of carbonized paper may be exposed to the electrolyte solution. In that embodiment, both sides of the carbonized paper may have $Co_3O_4$ nanorods deposited. In a related embodiment, two pieces of carbonized paper may be placed together, each with an outer face having deposited $Co_3O_4$ nanorods. In another related alternative embodiment, $Co_3O_4$ nanorods may be sandwiched between two pieces of carbonized paper.

As part of the electrode assembly, $Co_3O_4$ nanorods are added to the exposed carbonized paper region. In one embodiment, they may be added to the carbonized paper before fixing the carbonized paper in the tape or other substrate. Preferably, however, the $Co_3O_4$ nanorods are added after the carbonized paper is secured or assembled into an electrode assembly.

In one embodiment, the $Co_3O_4$ nanorods may be deposited by drop-drying a solution of $Co_3O_4$ nanorods onto the exposed carbonized paper. Here, $Co_3O_4$ nanorods may be dispersed in a liquid to a nanoparticle a concentration of 0.1-5 mg/mL, preferably 0.5-3 mg/mL, more preferably 0.7-1.3 mg/mL, though concentrations lower than 0.1 mg/mL or greater than 5 mg/mL may be used. The liquid may be water, chloroform, hexane, ethanol, methanol, acetone, or some other liquid or solvent that may evaporate at room temperature without unduly reacting with the carbonized paper or the $Co_3O_4$ nanorods. Preferably the liquid is water. In one embodiment, the $Co_3O_4$ nanorods may be dispersed by shaking, stirring, sonicating, or bubbling the solution. Preferably the $Co_3O_4$ nanorods are dispersed by sonication or ultrasonication. The dispersed mixture of $Co_3O_4$ nanorods may then be dropped, sprayed, spin-coated, spread, or otherwise applied to the exposed surface of the carbonized paper, at a density of 100-200 μg $Co_3O_4$ nanorods per cm$^2$ exposed electrode (μg/cm$^2$), preferably 110-190 μg/cm$^2$, more preferably 130-170 μg/cm$^2$, or about 150 μg/cm$^2$. The applied dispersed mixture may then be left at room temperature for 1-20 h, preferably 3-18 h, more preferably 4-16 h, or for an effective amount of time to dry the dispersed mixture and fix the $Co_3O_4$ nanorods to the carbonized paper. In one embodiment, the electrode assembly may be placed in a desiccator, with or without a vacuum applied, in order to dry the dispersed mixture.

By incorporating at least one surfactant in the liquid, the $Co_3O_4$ nanorods may become ordered, for example, by self-assembly. A surfactant may be present in the liquid at a concentration of 1-500 mM, preferably 10-400 mM, more preferably 50-350 mM. The surfactant may be an ionic surfactant, a nonionic surfactant, a biological surfactant, or some other type of surfactant.

Exemplary ionic surfactants include, but are not limited to, (1) anionic (based on sulfate, sulfonate or carboxylate anions), for example, perfluorooctanoate (PFOA or PFO), perfluorooctanesulfonate (PFOS), sodium dodecyl sulfate (SDS), ammonium lauryl sulfate, and other alkyl sulfate salts, sodium laureth sulfate (also known as sodium lauryl ether sulfate (SLES)), alkyl benzene sulfonate, soaps, and fatty acid salts; (2) cationic (based on quaternary ammonium cations), for example, cetyl trimethylammonium bromide (CTAB) (also known as hexadecyl trimethyl ammonium bromide), and other alkyltrimethylammonium salts, cetylpyridinium chloride (CPC), polyethoxylated tallow amine (POEA), benzalkonium chloride (BAC), and benzethonium chloride (BZT); and (3) zwitterionic (amphoteric), for example, dodecyl betaine, cocamidopropyl betaine, and coco ampho glycinate.

Exemplary nonionic surfactants include, but are not limited to, alkyl poly(ethylene oxide), alkylphenol poly(ethylene oxide), copolymers of poly(ethylene oxide) and poly (propylene oxide) (commercially known as Poloxamers or Poloxamines), polyoxyethylene octyl phenyl ether (TRITON X-100®), alkyl polyglucosides, for example, octyl glucoside and decyl maltoside, fatty alcohols, for example, cetyl alcohol and oleyl alcohol, cocamide MEA, cocamide DEA, and polysorbates (commercially known as TWEEN 20, TWEEN 80), for example, dodecyl dimethylamine oxide.

Exemplary biological surfactants include, but are not limited to, micellular-forming surfactants or surfactants that form micelles in solution, for example, DNA, vesicles, phospholipids, and combinations thereof. In other embodiments, other additives may be used to direct the growth of the nanoparticles, such as polyethylene glycol or sodium citrate. In one embodiment, the electrolyte solution comprises polyethylene glycol at a weight percentage of 1-8 wt %, preferably 2-7 wt %, more preferably 3-6 wt % relative to a total weight of the electrolyte solution. However, in some embodiments, the electrolyte solution may comprise polyethylene glycol at a weight percentage less than 1 wt % or greater than 8 wt % relative to a total weight of the electrolyte solution. The polyethylene glycol may have a weight average molecular weight of 0.2-500 kDa, preferably 1-300 kDa, more preferably 2-100 kDa.

In an alternative embodiment, electrocatalysts other than $Co_3O_4$ may be deposited on the carbonized paper for use as an electrode. For instance, molybdenum sulfide, quantum dots, perovskite, ITO, or a metal oxide made from any of the previously mentioned metal salts may be deposited as nanoparticles, microparticles, or some other nanostructured material.

In an alternative embodiment, the $Co_3O_4$ nanorods may be drop-dried or immobilized on a different conductive substrate, such as onto an ITO film or a gold film. In another alternative embodiment, the $Co_3O_4$ nanorods may be drop-dried or immobilized on a carbon substrate that is not from a pyrolyzed material, for instance, some other carbon electrode may be used.

In an alternative embodiment, the carbon-supported $Co_3O_4$ electrode, or some other electrode involving the $Co_3O_4$ nanoparticles, may be formed by lithography, more preferably nanolithography. Nanolithography techniques may be categorized as in series or parallel, mask or maskless/direct-write, top-down or bottom-up, beam or tip-based, resist-based or resist-less methods all of which are acceptable in terms of the present disclosure. Exemplary nanolithography techniques include, but are not limited to, optical lithography, photolithography, directed self-assembly, extreme ultraviolet lithography, electron beam lithography, electron beam direct write lithography, multiple electron beam lithography, nanoimprint lithography, step-and-flash imprint lithography, multiphoton lithography, scanning probe lithography, dip-pen nanolithography, thermochemical nanolithography, thermal scanning probe lithography, local oxidation nanolithography, molecular self-assembly, stencil lithography, X-ray lithography, laser printing of single nanoparticles, magnetolithography, nanosphere lithography, proton beam writing, charged particle lithography, ion projection lithography, electron projection lithography, neutral particle lithography and mixtures thereof. In another alternative embodiment, the carbon-supported $Co_3O_4$ electrode may be formed by a sol-gel, solvothermal synthesis, or chemical vapor deposition method. In another alternative embodiment, the carbon-supported $Co_3O_4$ electrode may be synthesized by two or more techniques, for instance, a nanolithography method and then an electrodeposition method.

In another alternative embodiment, a piece of $Co_3O_4$ may be formed as an electrode, and then etched to form a nanostructured surface having an increased surface area appropriate for electrocatalysis.

According to a third aspect, the present disclosure relates to an electrochemical cell, comprising the carbon-supported $Co_3O_4$ electrode of the second aspect, a counter electrode, and an electrolyte solution in contact with both electrodes. As used herein, the carbon-supported $Co_3O_4$ electrode may be considered the working electrode.

In one embodiment, the electrochemical cell is a vessel having an internal cavity for holding the electrolyte solution. The vessel may be cylindrical, cuboid, frustoconical, spherical, or some other shape. The vessel walls may comprise a material including, but not limited to, glass, polypropylene, polyvinyl chloride, polyethylene, and/or polytetrafluoroethylene, and the vessel walls may have a thickness of 0.1-3 cm, preferably 0.1-2 cm, more preferably 0.2-1.5 cm. The internal cavity may have a volume of 2 mL-100 mL, preferably 2.5 mL-50 mL, more preferably 3 mL-20 mL. In another embodiment, for instance, for small scale or benchtop anodization, the internal cavity may have a volume of 100 mL-50 L, preferably 1 L-20 L, more preferably 2 L-10 L. In another embodiment, for instance, for pilot plant anodization, the internal cavity may have a volume of 50 L-10,000 L, preferably 70 L-1,000 L, more preferably 80 L-2,000 L. In another embodiment, for instance, for industrial plant-scale anodization, the internal cavity may have a volume of 10,000 L-500,000 L, preferably 20,000 L-400,000 L, more preferably 40,000 L-100,000 L. In one embodiment, one or more electrochemical cells may be connected to each other in parallel and/or in series. In another embodiment, the electrolyte solution may be in contact with more than one working electrode and/or more than one counter electrode.

In one embodiment, the counter electrode comprises gold, platinum, or carbon. In a further embodiment, the counter electrode comprises platinum. In one embodiment, the counter electrode may be in the form of a wire, a rod, a cylinder, a tube, a scroll, a sheet, a piece of foil, a woven mesh, a perforated sheet, or a brush. The counter electrode may be polished in order to reduce surface roughness or may be texturized with grooves, channels, divots, microstructures, or nanostructures.

In another further embodiment, where the counter electrode comprises platinum, the counter electrode is in the form of rod or wire. Alternatively, the counter electrode may comprise some other electrically-conductive material such as platinum-iridium alloy, iridium, titanium, titanium alloy, stainless steel, gold, cobalt alloy and/or some other electrically-conductive material, where an "electrically-conductive material" as defined here is a substance with an electrical resistivity of at most $10^{-6} \Omega \cdot m$, preferably at most $10^{-7} \Omega \cdot m$, more preferably at most $10^{-8} \Omega \cdot m$ at a temperature of 20-25° C. In another alternative embodiment, the working electrode may not comprise indium, but may comprise any of the previously mentioned metals.

In a preferred embodiment, the counter electrode has at least one outer surface comprising an essentially inert, electrically conducting chemical substance, such as platinum, gold, or carbon. In another embodiment, the counter electrode may comprise solid platinum, gold, or carbon. The form of the counter electrode may be generally relevant only in that it needs to supply sufficient current to the electrolyte solution to support the current required for electrochemical reaction of interest. The material of the counter electrode should thus be sufficiently inert to withstand the chemical conditions in the electrolyte solution, such as acidic or basic pH values, without substantially degrading during the electrochemical reaction. The counter electrode preferably should not leach out any chemical substance that interferes with the electrochemical reaction or might lead to undesirable contamination of either electrode.

In a further embodiment, where the counter electrode comprises platinum, the counter electrode may be in the form of a mesh. In one embodiment, the counter electrode in the form of a mesh may have a nominal aperture or pore diameter of 0.05-0.6 mm, preferably 0.1-0.5 mm, more preferably 0.2-0.4 mm, and/or a wire diameter of 0.01-0.5 mm, preferably 0.08-0.4 mm, more preferably 0.1-0.3 mm. In other embodiments, the counter electrode may be considered a gauze with a mesh number of 40-200, preferably 45-150, more preferably 50-100. In other embodiments, the counter electrode may be in the form of a perforated sheet or a sponge. In one embodiment, the counter electrode may be in the form of a mesh with one or more bulk dimensions (length, width, or thickness) as previously described for the indium foil working electrode.

In one embodiment, the counter electrode is in the form of a rod or wire. The rod or wire may have straight sides and a circular cross-section, similar to a cylinder. A ratio of the length of the rod or wire to its width may be 1,500:1-1:1, preferably 500:1-2:1, more preferably 300:1-3:1, even more preferably 200:1-4:1. The length of the rod or wire may be 0.5-50 cm, preferably 1-30 cm, more preferably 3-20 cm, and a long wire may be coiled or bent into a shape that allows the entire wire to fit into an electrochemical cell. The diameter of the rod or wire may be 0.5-20 mm, preferably 0.8-8 mm, more preferably 1-3 mm. In some embodiments, a rod may have an elongated cross-section, similar to a ribbon or strip of metal.

In one embodiment, the electrolyte solution comprises water and an inorganic base at a concentration of 0.05-0.4 M, preferably 0.07-0.3 M, more preferably 0.08-0.2 M, or about 0.1 M, though in some embodiments, the inorganic base may be present at a concentration of less than 0.05 M or greater than 0.4 M. The inorganic base may be KOH, LiOH, NaOH, $Be(OH)_2$, $Mg(OH)_2$, $Ca(OH)_2$, $Sr(OH)_2$, $Ba(OH)_2$, or some other inorganic base. Preferably the inorganic base is NaOH. In an alternative embodiment, an organic base may be used, such as sodium acetate. In another alternative embodiment, an acid may be used instead of a base.

The water may be tap water, distilled water, bidistilled water, deionized water, deionized distilled water, reverse osmosis water, and/or some other water. In one embodiment the water is bidistilled to eliminate trace metals. Preferably the water is bidistilled, deionized, deionized distilled, or reverse osmosis water and at 25° C. has a conductivity at less than 10 $\mu S \cdot cm^{-1}$, preferably less than 1 $\mu S \cdot cm^{-1}$, a resistivity greater than 0.1 $M\Omega \cdot cm$, preferably greater than 1 $M\Omega \cdot cm$, more preferably greater than 10 $M\Omega \cdot cm$, a total solid concentration less than 5 mg/kg, preferably less than 1 mg/kg, and a total organic carbon concentration less than 1000 µg/L, preferably less than 200 µg/L, more preferably less than 50 µg/L.

In one embodiment, the carbon-supported $Co_3O_4$ electrode has a current density of 30-45 $mA/cm^2$, preferably 31-40 $mA/cm^2$, more preferably 32-37 $mA/cm^2$ when the electrodes are subjected to a potential of 1.3-1.8 V, preferably 1.4-1.7 V. In some embodiments, the carbon-supported $Co_3O_4$ electrode may have a current density of less than 30 $mA/cm^2$ when the electrodes are subjected to a potential of less than 1.3, and/or a current density of greater than 45 $mA/cm^2$ when subjected to a potential of greater than 1.8 V.

Preferably, to maintain uniform concentrations and/or temperatures of the electrolyte solution, the electrolyte solution may be stirred or agitated during the step of the subjecting. The stirring or agitating may be done intermittently or continuously. This stirring or agitating may be by a magnetic stir bar, a stirring rod, an impeller, a shaking platform, a pump, a sonicator, a gas bubbler, or some other device. Preferably the stirring is done by an impeller or a magnetic stir bar.

Figure 5:
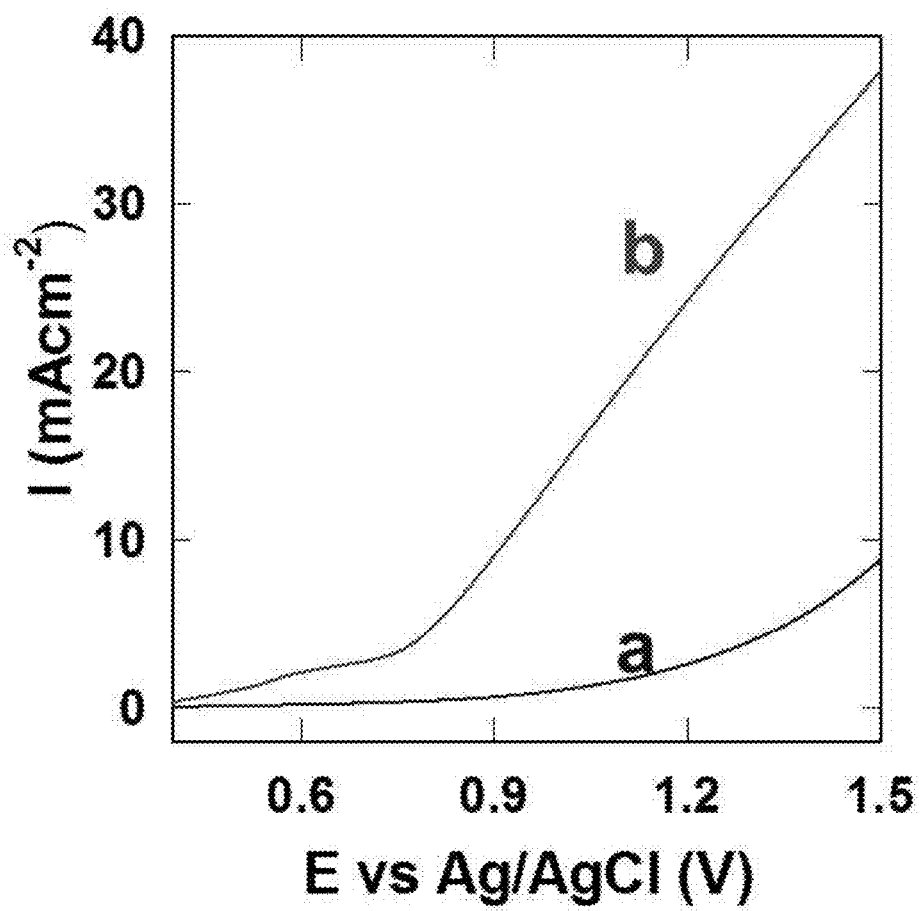
FIG. 5 shows a linear sweep voltammogram (LSV) of (a) a bare FPCE and (b) a carbon-supported $Co_3O_4$ electrode.

In one embodiment, a carbon-supported $Co_3O_4$ electrode may have a higher current density than a bare carbon electrode, where the bare carbon electrode has essentially the same structure without $Co_3O_4$ nanorods. For example, the bare carbon electrode may comprise bare carbonized paper, and may be housed in a similar electrode assembly. Here, over the same range of electrical potential and in similar electrochemical cells, the carbon-supported $Co_3O_4$ electrode may have a current density that is greater by a factor of 3-12, preferably 4-10, than the current density of the bare carbon electrode. FIG. 5 shows one example, where a linear sweep voltammogram shows the current densities of a bare carbon electrode (curve "a," i.e. FPCE) in relation to a carbon-supported $Co_3O_4$ electrode ("b"). This difference in current densities may lead to the carbon-supported $Co_3O_4$ electrode supporting a faster chemical reaction rate in an electrochemical cell.

In one embodiment, the electrochemical cell of claim further comprises a reference electrode in contact with the electrolyte solution. A reference electrode is an electrode which has a stable and well-known electrode potential. The high stability of the electrode potential is usually reached by employing a redox system with constant (buffered or saturated) concentrations of each relevant species of the redox reaction. A reference electrode may enable a potentiostat to deliver a stable voltage to the working electrode or the counter electrode. The reference electrode may be a standard hydrogen electrode (SHE), a normal hydrogen electrode (NHE), a reversible hydrogen electrode (RHE), a saturated calomel electrode (SCE), a copper-copper(II) sulfate electrode (CSE), a silver chloride electrode (Ag/AgCl), a pH-electrode, a palladium-hydrogen electrode, a dynamic hydrogen electrode (DHE), a mercury-mercurous sulfate electrode, or some other type of electrode. In a preferred embodiment, a reference electrode is present and is a silver chloride electrode (Ag/AgCl). However, in some embodiments, the electrochemical cell does not comprise a third electrode.

Figure 6:
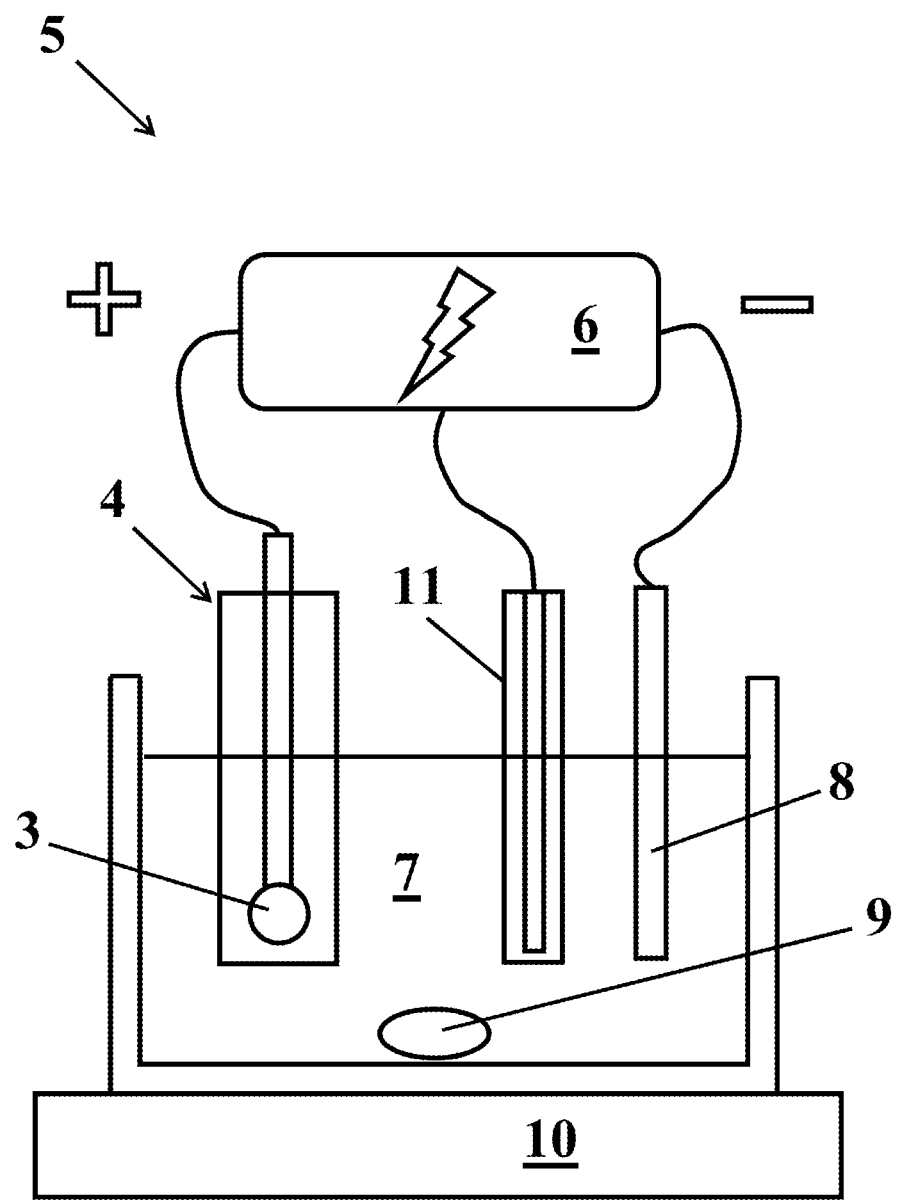
FIG. 6 shows an electrochemical cell that comprises a carbon-supported $Co_3O_4$ electrode.

FIG. 6 shows an example electrochemical cell 5 having the electrode assembly 4, the counter electrode 8, and a reference electrode 11, all with electrical connections with the potentiometer 6. The carbon-supported $Co_3O_4$ electrode 3, counter electrode 8, and reference electrode 11 are all in contact with the same volume of electrolyte solution 7. The electrochemical cell may include a stir bar 9 and a magnetic stir plate 10 to provide continuous stirring to the electrolyte solution 7. The carbon-supported $Co_3O_4$ electrode 3 is configured to receive a positive voltage as an anode and evolve $O_2$ gas, and the counter electrode 8 is configured to receive a negative voltage as the cathode and evolve $H_2$ gas.

According to a fourth embodiment, the present disclosure relates to a method for decomposing water into $H_2$ and $O_2$. This method involves the step of subjecting the electrodes of the electrochemical cell of the third aspect with a potential of 0.5-2.0 V, preferably 0.7-1.5 V, more preferably 0.9-1.4 V. Here, "the electrodes" refers to the carbon-supported $Co_3O_4$ electrode and the counter electrode. However, in some embodiments, the electrodes may be subjected to a potential of less than 0.5 V or greater than 2.0 V.

Preferably the carbon-supported $Co_3O_4$ electrode functions as the anode, receiving a positive potential to oxidize $OH^-$ into $O_2$ gas and $H_2O$, while the counter electrode functions as the cathode, receiving a negative potential to reduce water into $H_2$ gas and $OH^-$. This is summarized by the following reactions:

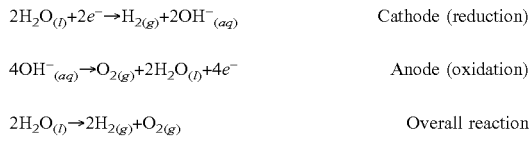

$$2H_2O_{(l)} + 2e^- \rightarrow H_{2(g)} + 2OH^-_{(aq)} \quad \text{Cathode (reduction)}$$

$$4OH^-_{(aq)} \rightarrow O_{2(g)} + 2H_2O_{(l)} + 4e^- \quad \text{Anode (oxidation)}$$

$$2H_2O_{(l)} \rightarrow 2H_{2(g)} + O_{2(g)} \quad \text{Overall reaction}$$

In another embodiment, the potentials may be switched, wherein the carbon-supported $Co_3O_4$ electrode functions as the cathode and receives a negative potential, and the counter electrode functions as the anode and receives a positive potential. In an alternative embodiment, the electrodes may be subjected to an alternating current (AC) in which the anode and cathode roles are continually switched between the two electrodes.

In one embodiment, the potential may be applied to the electrodes by a battery, such as a battery comprising one or more electrochemical cells of alkaline, lithium, lithium-ion, nickel-cadmium, nickel metal hydride, zinc-air, silver oxide, and/or carbon-zinc. In another embodiment, the potential may be applied through a potentiostat or some other source of direct current, such as a photovoltaic cell. In one embodiment, a potentiostat may be powered by an AC adaptor, which is plugged into a standard building or home electric utility line. In one embodiment, the potentiostat may connect with a reference electrode in the electrolyte solution. Preferably the potentiostat is able to supply a relatively stable voltage or potential. For example, in one embodiment, the electrochemical cell is subjected to a voltage that does not vary by more than 5%, preferably by no more than 3%, preferably by no more than 1.5% of an average value throughout the subjecting. In another embodiment, the voltage may be modulated, such as being increased or decreased linearly, being applied as pulses, or being applied with an alternating current. Preferably, the carbon-supported $Co_3O_4$ electrode may be considered the working electrode with the counter electrode being considered the auxiliary electrode. However, in some embodiments, the carbon-supported $Co_3O_4$ electrode may be considered the auxiliary electrode with the counter electrode being considered the working electrode.

In one embodiment, the method further comprises the step of separately collecting $H_2$-enriched gas and $O_2$-enriched gas. In one embodiment, the space above each electrode may be confined to a vessel in order to receive or store the evolved gases from one or both electrodes. The collected gas may be further processed, filtered, or compressed. Preferably the $H_2$-enriched gas is collected above the cathode, and the $O_2$-enriched gas is collected above the anode. The electrolytic cell, or an attachment, may be shaped so that the headspace above the carbon-supported $Co_3O_4$ electrode is kept separate from the headspace above the reference electrode. In one embodiment, the $H_2$-enriched gas and the $O_2$-enriched gas are not 100 vol % $H_2$ and 100 vol % $O_2$, respectively. For example, the enriched gases may also comprise $N_2$ from air, and water vapor and other dissolved gases from the electrolyte solution. The $H_2$-enriched gas may also comprise $O_2$ from air. The $H_2$-enriched gas may comprise greater than 20 vol % $H_2$, preferably greater than 40 vol % $H_2$, more preferably greater than 60 vol % $H_2$, even more preferably greater than 80 vol % $H_2$, relative to a total volume of the receptacle collecting the evolved $H_2$ gas. The $O_2$-enriched gas may comprise greater than 20 vol % $O_2$, preferably greater than 40 vol % $O_2$, more preferably greater than 60 vol % $O_2$, even more preferably greater than 80 vol % $O_2$, relative to a total volume of the receptacle collecting the evolved $O_2$ gas. In some embodiments, the evolved gases may be bubbled into a vessel comprising water or some other liquid, and higher concentrations of $O_2$ or $H_2$ may be collected. In one embodiment, evolved $O_2$ and $H_2$, or $H_2$-enriched gas and $O_2$-enriched gas, may be collected in the same vessel.

Several parameters for the method for decomposing water may be modified to lead to different reaction rates, yields, and other outcomes. These parameters include, but are not limited to, electrolyte type and concentration, pH, pressure, solution temperature, current, voltage, stirring rate, electrode surface area, size of $Co_3O_4$ nanoparticles, carbonized paper porosity, and exposure time. A variable DC current may be applied at a fixed voltage, or a fixed DC current may be applied at a variable voltage. In some instances, AC current or pulsed current may be used. A person having ordinary skill in the art may be able to adjust these and other parameters, to achieve different desired nanostructures. In other embodiments, the electrochemical cell may be used for other electrochemical reactions or analyses.

In an alternative embodiment, the carbon-supported $Co_3O_4$ electrode may be used in the field of batteries, fuel cells, photochemical cells, water splitting cells, electronics, water purification, hydrogen sensors, semiconductors (such as field effect transistors), magnetic semiconductors, capacitors, data storage devices, biosensors (such as redox protein sensors), photovoltaics, liquid crystal screens, plasma screens, touch screens, OLEDs, antistatic deposits, optical coatings, reflective coverings, anti-reflection coatings, and/or reaction catalysis. Similarly, in one embodiment, the carbon-supported $Co_3O_4$ electrode may be coated with another material. For example, the carbon-supported $Co_3O_4$ electrode may be coated with a layer of gold. A gold-coated carbon-supported $Co_3O_4$ electrode may then be used for analyte detection using surface enhanced Raman scattering (SERS).

The examples below are intended to further illustrate protocols for preparing, characterizing $Co_3O_4$ nanorods, and uses thereof, and are not intended to limit the scope of the claims.

EXAMPLE 1

Experimental

To prepare the nano-$Co_3O_4$ ($Co_3O_4$ nanorods), 400 mg of $Co(NO_3)_2 \cdot 6H_2O$ (obtained from Sigma-Aldrich) was transferred into an alumina crucible, which was then placed into a glass tube of a tubular furnace. Next, the mass was heated at 520° C. for 3 h in a normal aerial atmosphere to obtain nano-$Co_3O_4$. Finally, the nano-$Co_3O_4$ was collected and characterized with XRD (using a Rigaku Ultima IV diffractometer equipped with Cu K-alpha radiation), FESEM (using a TESCAN LYRA 3, Czech Republic), energy dispersive spectroscopy (EDS) (using an Xmass detector, Oxford Instruments, equipped with the TESCAN LYRA 3), and TEM (using a JEOL JEM-2100F).

As mentioned above, the prepared nano-$Co_3O_4$ was immobilized on an FPCE, and to do so the nano-$Co_3O_4$ was first dispersed in water at a concentration of 1 mg/mL via ultrasonication. A volume of 30 μL of this dispersion was then dropped on the working electrode (area 0.2 cm$^2$) of the FPCE, and dried at room temperature to obtain an FPCE modified with nano-$Co_3O_4$ ($Co_3O_4$/FPCE). Note that the FPCE had been prepared by carrying out a pyrolysis of cut pieces (2 cm×2 cm) of filter paper (purchased from Sigma-Aldrich) under a nitrogen atmosphere at 850° C. for 5 h, and a photograph of the used form of the FPCE, which was prepared according to an earlier report, is shown in FIG. 1. See M. A. Aziz, D. Theleritis, M. O. Al-Shehri, M. I. Ahmed, M. Qamaruddin, A. S. Hakeem, A. Helal, M. A. A. Qasem, Chemistry Select 2017, 2, 4787-4793, incorporated herein by reference in its entirety. Bare FPCE or $Co_3O_4$/FPCE was used as the working electrode, and a Pt wire and Ag/AgCl electrode served as the counter and reference electrodes, respectively. Electrochemical data were obtained using a CHI (760E) electrochemical workstation.

EXAMPLE 2

Results and Discussion

Figure 2A:
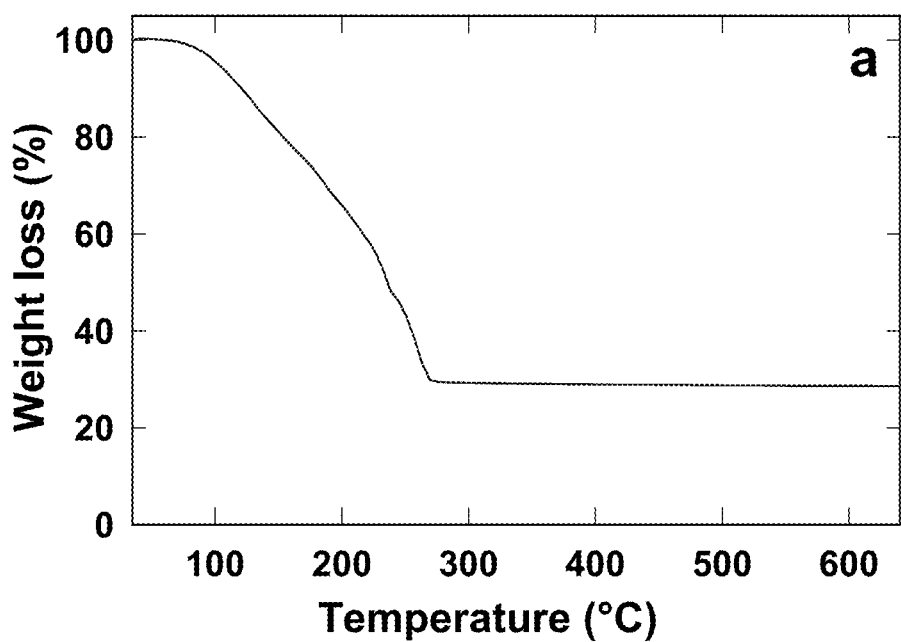
FIG. 2A is a TGA curve of Co(NO$_3$)$_2$.6H$_2$O over a temperature range.
Figure 2B:
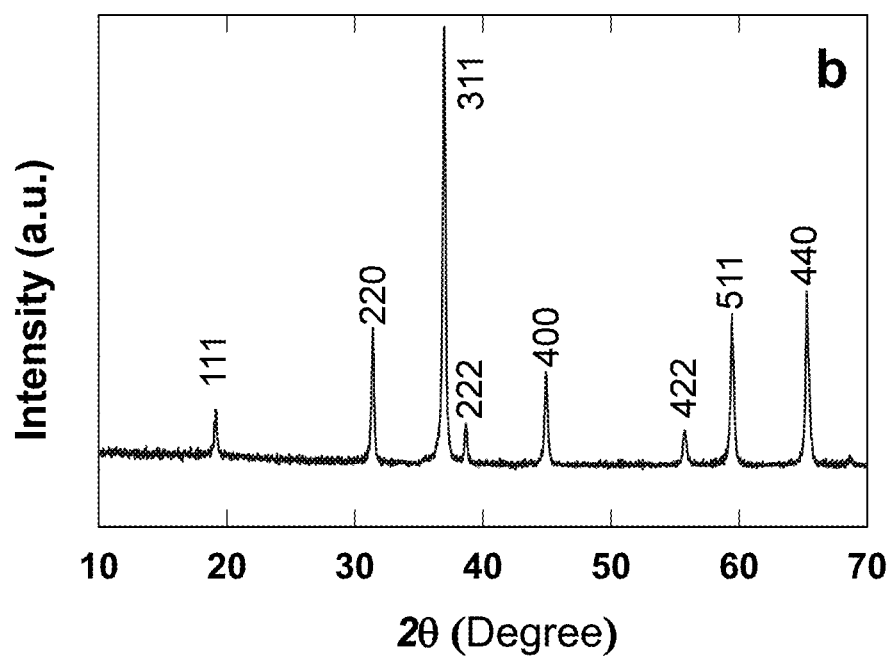
FIG. 2B shows XRD patterns of Co$_3$O$_4$ nanorods prepared by thermal decomposition of Co(NO$_3$)$_2$.6H$_2$O at a temperature of 520° C. for 3 h.

FIG. 2A shows a thermal gravimetric analysis (TGA) of $Co(NO_3)_2 \cdot 6H_2O$; this TGA experiment was carried out at a scanning rate of 10° C./min from 35° C. to 640° C. in air. The TGA curve indicated that a sharp weight loss occurred upon heating the sample from 65° C. to 270° C., at which point only 30% of the original weight of $Co(NO_3)_2 \cdot 6H_2O$ remained. Further increasing the temperature to 640° C. did not yield any additional weight loss. The weight loss that occurred from 65° C. to 270° C. was attributed to the loss of water molecules and decomposition of $Co(NO_3)_2$ to cobalt oxide. See . D. ivković et al., incorporated herein by reference in its entirety. Even though applying a relatively low temperature of ≥270° C. converted $Co(NO_3)_2 \cdot 6H_2O$ to cobalt oxide, 520° C. was chosen for this conversion in subsequent experiments. A detailed study of the temperature dependence of the formation of cobalt oxide from $Co(NO_3)_2 \cdot 6H_2O$ is in progress. FIG. 2B shows the XRD pattern of the product of heating the $Co(NO_3)_2 \cdot 6H_2O$ at 520° C. for three hours in a normal aerial atmosphere. The obtained peaks were very sharp, indicating the product to be highly crystalline. The peak positions at 2θ values of 19.131, 31.397, 36.967, 38.633, 44.909, 55.712, 59.433, and 65.287 were attributed to the 111, 220, 311, 222, 400, 422, 511, and 440 crystal planes of cubic $Co_3O_4$ based on JCPDS 42-1467. This result clearly indicated the formation of pure single-phase cubic $Co_3O_4$ upon carrying out a heat treatment of $Co(NO_3)_2 \cdot 6H_2O$ at 520° C. for three hours in normal aerial conditions.

Figure 3A:
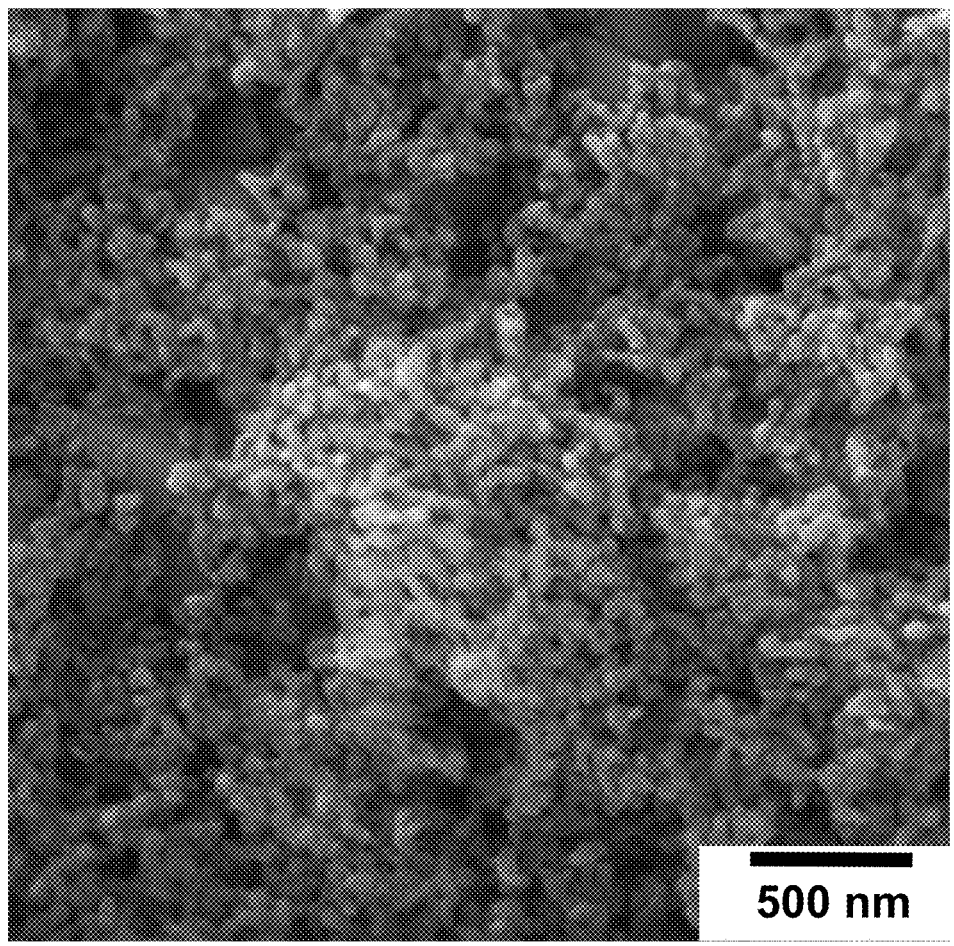
FIG. 3A is an SEM image of Co$_3$O$_4$ nanorods.
Figure 3B:
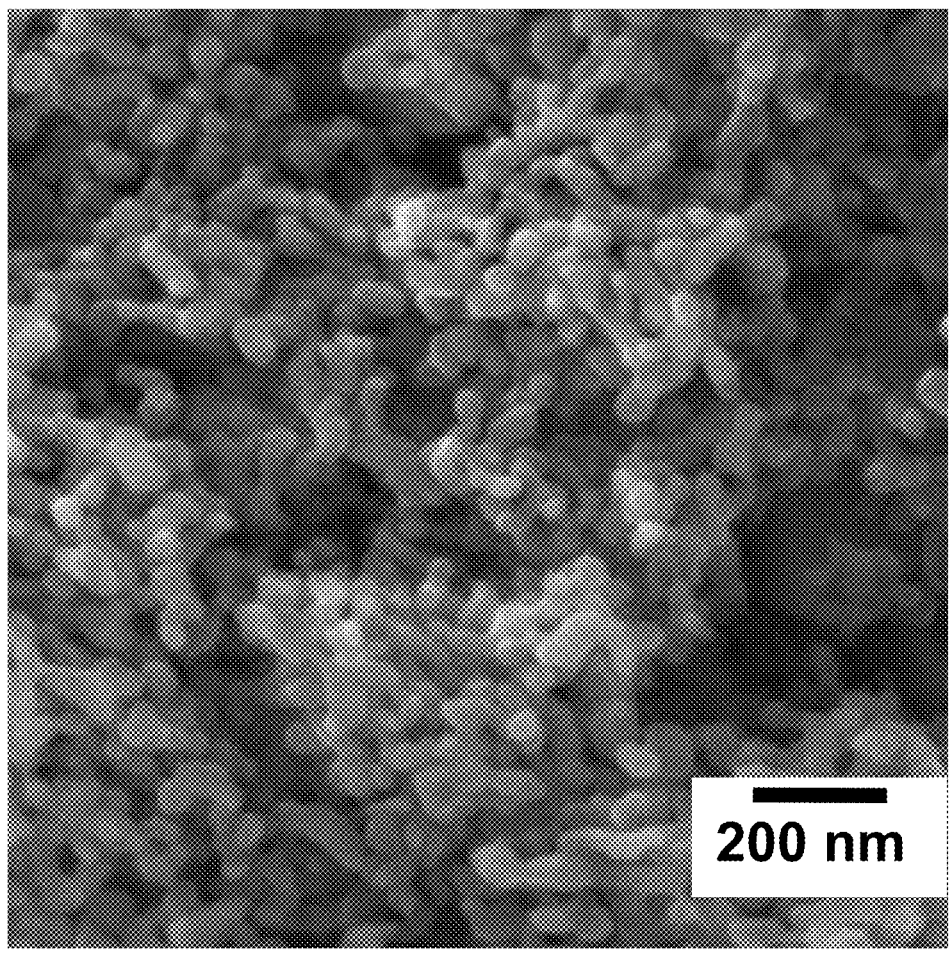
FIG. 3B is a magnified view of FIG. 3A.
Figure 3C:
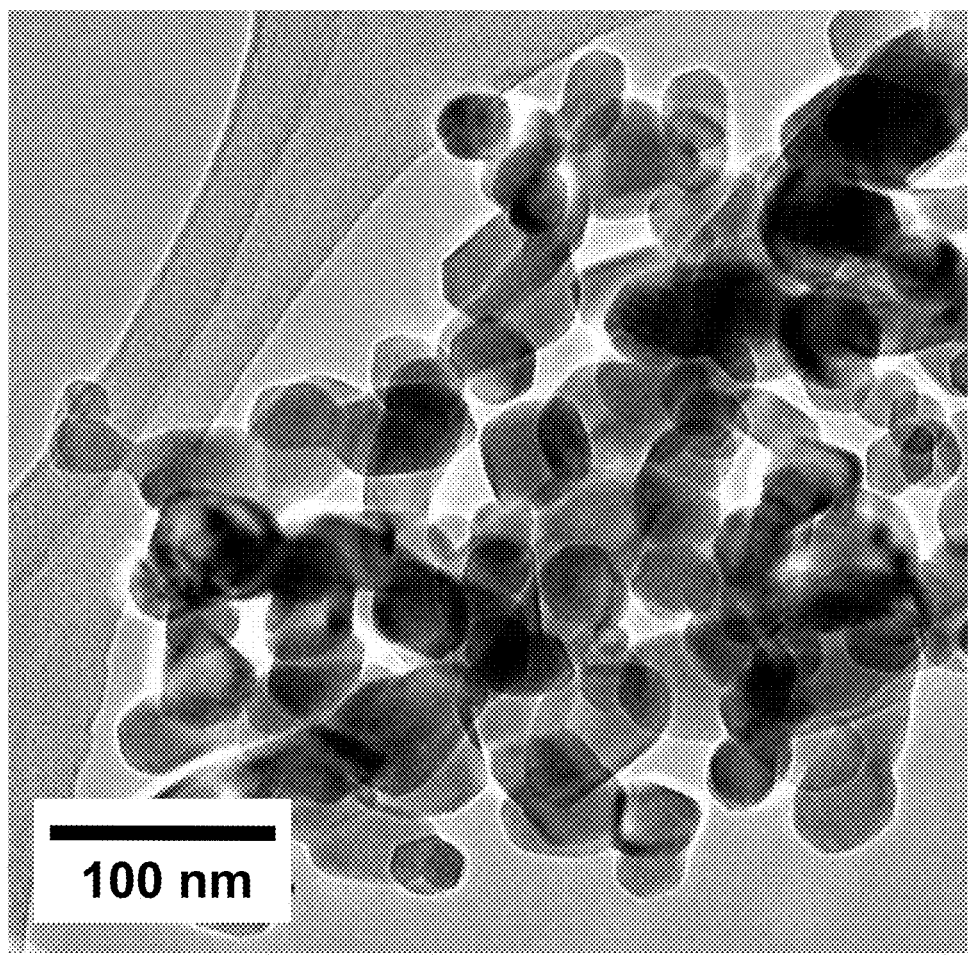
FIG. 3C shows a TEM image of $Co_3O_4$ nanorods.
Figure 3D:
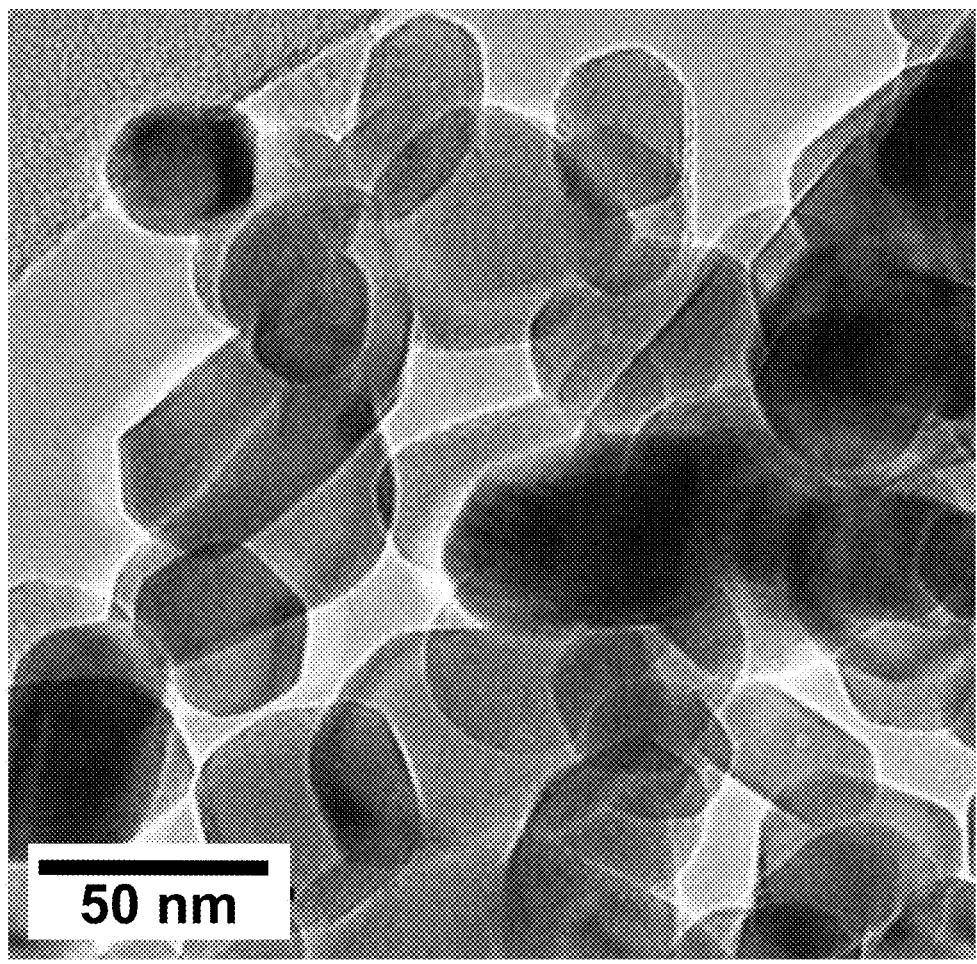
FIG. 3D is a magnified view of FIG. 3C.
Figure 3E:
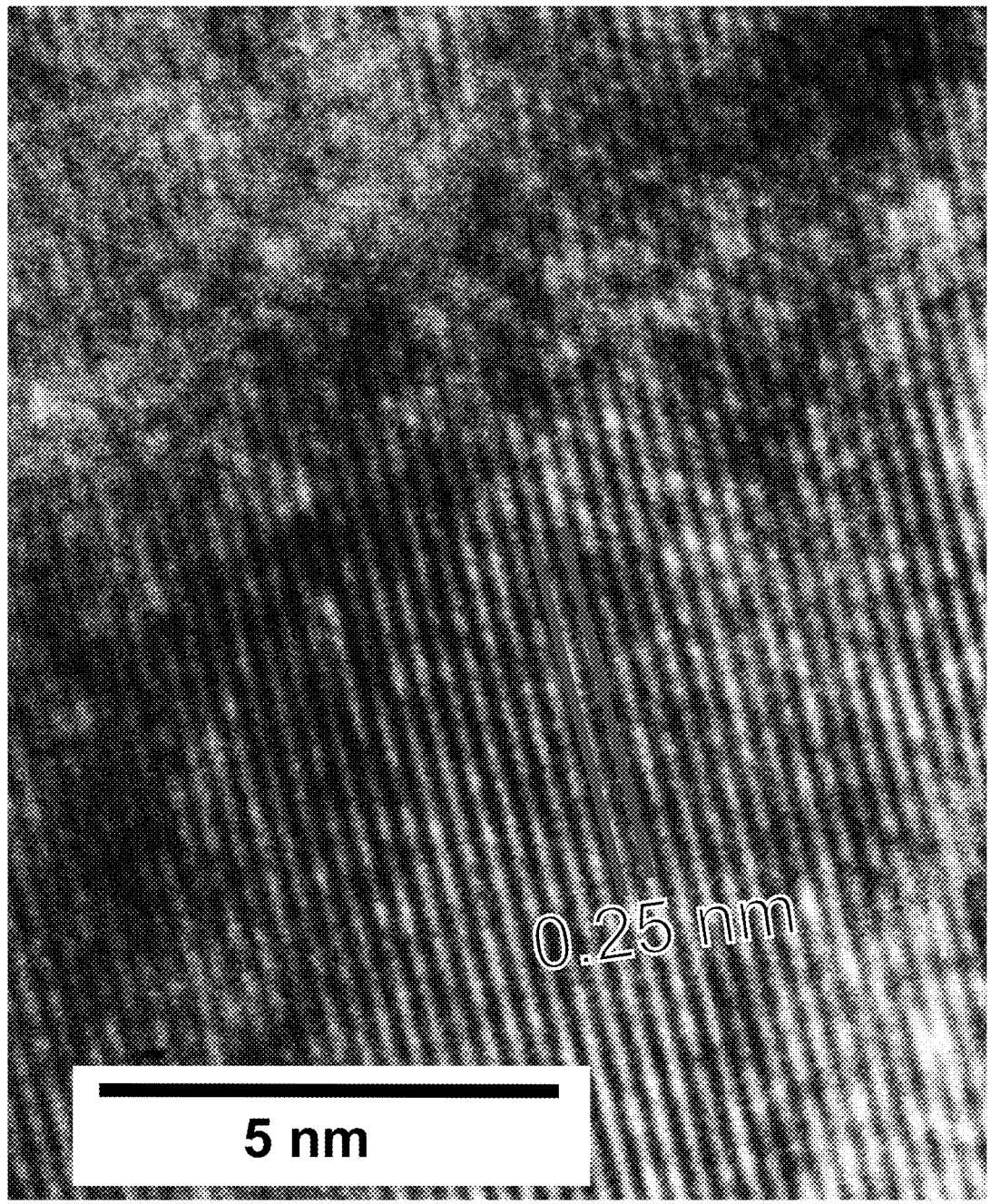
FIG. 3E is a HRTEM image of a $Co_3O_4$ nanorod showing the plane spacing.
Figure 3F:
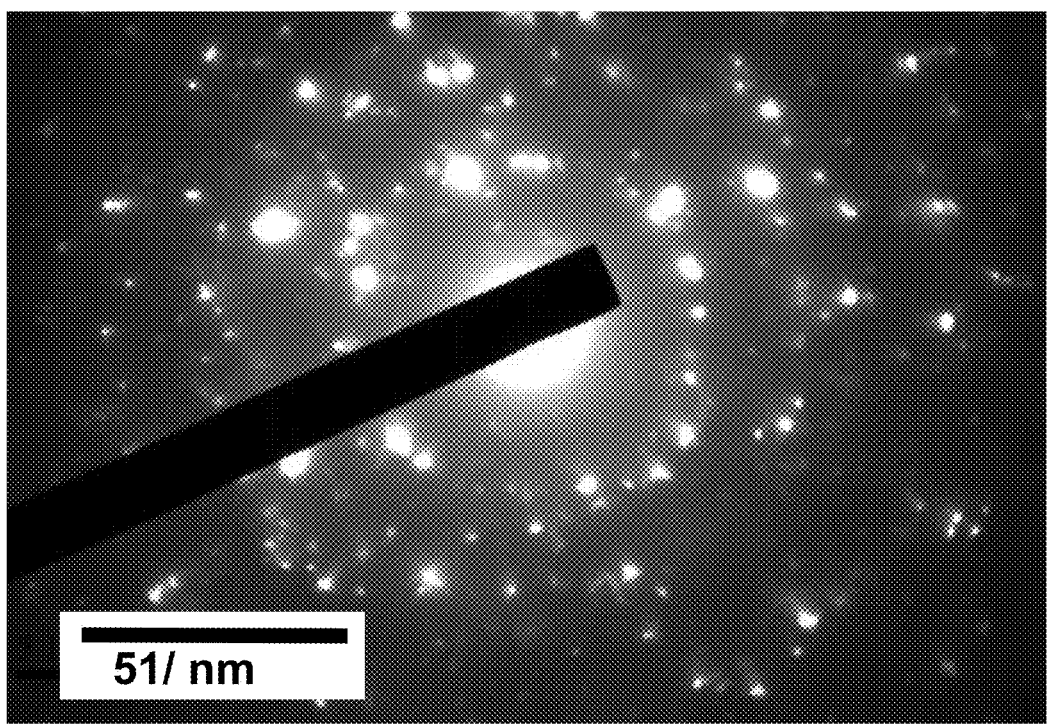
FIG. 3F is a selected area electron diffraction (SAED) image of a $Co_3O_4$ nanorod.

Next, the morphology of the prepared $Co_3O_4$ was studied. FIGS. 3A and 3C show the FESEM and TEM images of the prepared nano-$Co_3O_4$. FIGS. 3B and 3D are magnified views of FIGS. 3A and 3C, respectively. The initial FESEM image (FIG. 3A) indicated the presence of homogeneously dispersed nano-$Co_3O_4$. The magnified view of this image (FIG. 3B) and the TEM images (FIGS. 3C and D) clearly shows that the shape of the nano-$Co_3O_4$ is a short rod. The diameters and lengths of the $Co_3O_4$ nanorods were measured to range from 20.5 to 45.9 nm and from 28.3 to 69.4 nm, respectively, with the average diameter being 32.0 nm. The distances between the planes observed in the HRTEM image were 0.25 nm (marked in FIG. 3E), corresponding to the 311 planes of cubic $Co_3O_4$, which yielded the strongest peak in its XRD pattern (FIG. 2B). See D. Su et al., incorporated herein by reference in its entirety. The selected area electron diffraction (SAED) image of the obtained $Co_3O_4$ nanorod (FIG. 3F) revealed its high-order crystallinity.

Figure 4B:
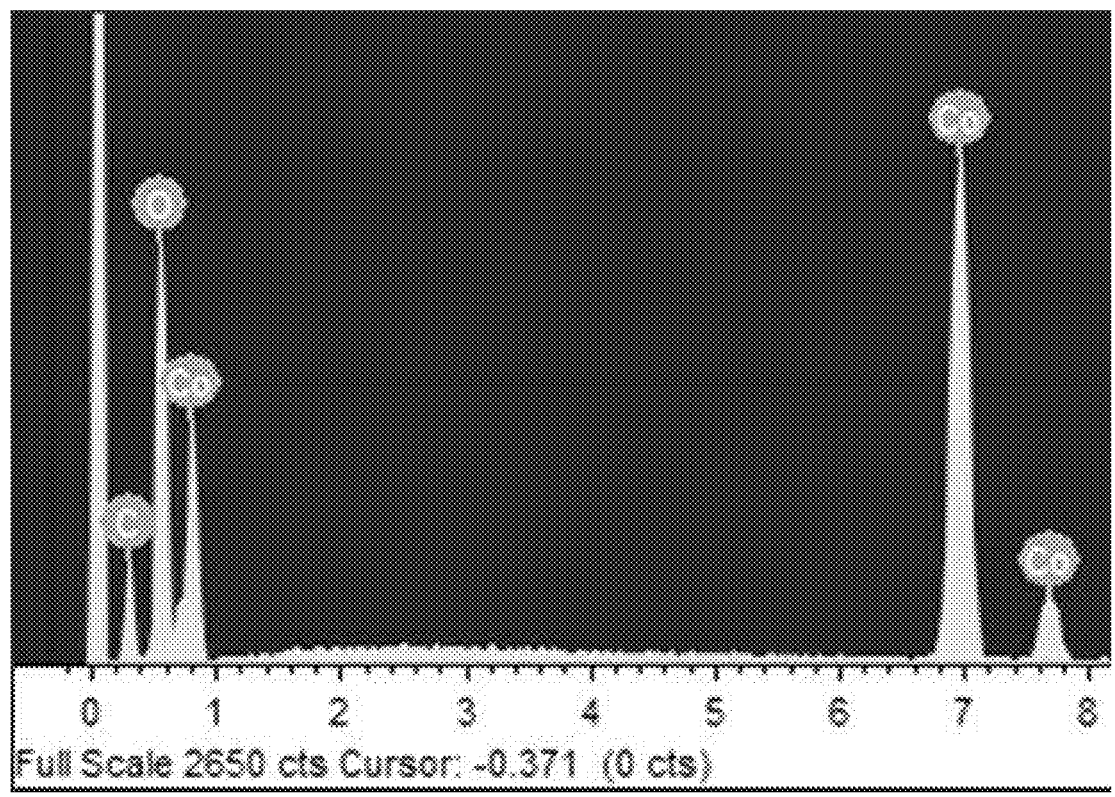
FIG. 4B is an EDS spectrum of the boxed area of the carbon-supported $Co_3O_4$ electrode as shown in FIG. 4A.

In order to evaluate the electrocatalytic properties of nano-$Co_3O_4$, nano-$Co_3O_4$ was immobilized on FPCE as the substrate electrode, rather than the more common glassy carbon electrode, because FPCE is micro-nanoporous in nature and has a high electroactive surface area. The micro-nanoporous cavities of FPCE were expected to be helpful in creating a homogeneous distribution of immobilized nanostructured materials, rather than aggregates only in certain locations, when using the drop-drying method. FIG. 4A shows an FESEM image of a nano-$Co_3O_4$/FPCE, which was prepared by drop-drying of an aqueous solution of the prepared nano-$Co_3O_4$. To visualize the distribution of the nano-$Co_3O_4$ on a comparatively large surface of FPCE, FESEM images were also recorded at comparatively low magnifications. The FESEM image showed the nano-$Co_3O_4$ to form aggregates (clusters), but these aggregates were observed to be distributed homogeneously throughout the surface (i.e., not gathering only in certain areas). Note that the gathering of immobilized nanostructured materials in only certain places on bare solid substrate materials is very commonly observed when carrying out drop-drying, and such gathering limits a wide practical application of the drop-drying method. See M. Majumder, C. S. Rendall, J. A. Eukel, J. Y. L. Wang, N. Behabtu, C. L. Pint, T. Liu, A. W. Orbaek, F. Mirri, J. Nam, A. R. Barron, R. H. Hauge, H. K. Schmidt, M. Pasquali, *J. Phys. Chem. B* 2012, 116, 6536-6542; R. Duggal, F. Hussain, M. Pasquali, *Adv. Mater* 2006, 18, 29-34; and M. A. Aziz, W. Mahfoz, M. N. Shaikh, M. H. Zahir, A. Al-Betar, M. Oyama, D. Theleritis, Z. H. Yamani, *Electroanalysis* 2017, 29, 1683-1690, each incorporated herein by reference in their entirety. The relatively homogenous distribution of the nano-$Co_3O_4$ on the FPCE may result from the micro-nanostructured cavities of the FPCE. These cavities perhaps hindered the gathering of nano-$Co_3O_4$ in certain places during the drying of the nano-$Co_3O_4$ solution. FIG. 4B shows the corresponding EDS spectrum of the FPCE modified with nano-$Co_3O_4$; this spectrum indicated the presence of the expected elements, i.e., C, O, and Co.

FIG. 5 shows linear sweep voltammograms (LSVs) of the bare FPCE (a) and nano-$Co_3O_4$/FPCE (b) in 0.1 M NaOH. Comparison of these two LSVs readily showed an improvement in the electrocatalytic properties toward water electrolysis upon immobilization of $Co_3O_4$ nanorods on the FPCE. The achieved water electrooxidation current densities at 1.5 V were 37.89 mA·$cm^{-2}$ and 8.80 mA·$cm^{-2}$ for nano-$Co_3O_4$/FPCE and FPCE, respectively. Also note that nano-$Co_3O_4$/FPCE started water electrolysis at a low potential of 0.7 V. These results taken together revealed the good electrocatalytic properties of the prepared $Co_3O_4$ nanorods towards water electrolysis.

Here, nano-$Co_3O_4$ was prepared by carrying out a direct thermal decomposition of $Co(NO_3)_2.6H_2O$ at 520° C. in an aerial atmosphere, and pretreatment by organic or inorganic compounds was not required. The prepared nanostructured materials were characterized by field emission scanning electron microscopy (FESEM), transmission electron microscopy (TEM), and X-ray diffraction (XRD) data. These analyses confirmed the formation of highly crystalline $Co_3O_4$ nanorods with an average diameter of about 32 nm. The electrocatalytic properties of the prepared nano-$Co_3O_4$ toward water electrooxidation in alkaline medium were also evaluated by immobilizing nano-$Co_3O_4$ on a filter-paper-derived carbon electrode (FPCE), which was prepared by pyrolysis of normal filter paper. The modified electrode showed good electrocatalytic properties toward water electrolysis in an alkaline solution. This prepared nano-$Co_3O_4$ could potentially play an important role in various practical fields and applications such as catalysis, electronics, optoelectrical devices, and electrochemical applications including electrochemical sensors, biosensors, gas sensors, batteries, capacitors, solar cells, fuel cells, and water splitting.

The invention claimed is:

1. A method for making $Co_3O_4$ nanorods, the method comprising:
heating at least one of $Co(NO_3)_2$ and $Co(NO_3)_2 \cdot 6H_2O$ in air for 1-6 h at a temperature of 420-700° C. to produce $Co_3O_4$ nanorods by thermal decomposition,
wherein the $Co_3O_4$ nanorods have an average diameter of 10-70 nm and an average length of 20-100 nm.

2. The method of claim 1, wherein the cobalt of the cobalt salt consists essentially of cobalt having a +2 oxidation state.

3. The method of claim 1, wherein the $Co_3O_4$ nanorods have an average aspect ratio of 1.05:1-3.0:1.

4. The method of claim 1, wherein the $Co_3O_4$ nanorods have a crystalline morphology.

5. The method of claim 1, wherein at least 70% of the $Co_3O_4$ nanorods have an average diameter of 25-60 nm.

6. The method of claim 1, wherein the cobalt salt is $Co(NO_3)_2.6H_2O$.

7. A carbon-supported $Co_3O_4$ electrode, comprising:
carbonized paper and
$Co_3O_4$ nanorods having an average diameter of 10-70 nm and an average length of 20-100 nm, deposited on the carbonized paper,
wherein the carbon-supported $Co_3O_4$ electrode is substantially free of $Co^0$.

8. The carbon-supported $Co_3O_4$ electrode of claim 7, wherein the $Co_3O_4$ nanorods consist essentially of $Co_3O_4$.

9. The carbon-supported $Co_3O_4$ electrode of claim 7, wherein a surface density of the $Co_3O_4$ nanorods on the carbonized paper is 100-200 µg/$cm^2$.

10. The carbon-supported $Co_3O_4$ electrode of claim 7, wherein the $Co_3O_4$ nanorods are aggregated into clusters having diameters of 1-20 µm.

11. The carbon-supported $Co_3O_4$ electrode of claim 10, wherein the clusters have a nearest neighbor distance of 500 nm-20 µm.

12. The carbon-supported $Co_3O_4$ electrode of claim 7, wherein the $Co_3O_4$ nanorods are made by heating a cobalt salt in air for 1-6 h at a temperature of 420-700° C. to produce $Co_3O_4$ nanorods by thermal decomposition.

13. The carbon-supported $Co_3O_4$ electrode of claim 7, wherein the carbonized paper is made by heating a paper at 700-950° C. for 1-12 h in an inert atmosphere.

14. The carbon-supported $Co_3O_4$ electrode of claim 7, wherein the paper is a filter paper.

15. An electrochemical cell, comprising:
the carbon-supported $Co_3O_4$ electrode of claim 10;
a counter electrode; and
an electrolyte solution in contact with both electrodes.

16. The electrochemical cell of claim 15, further comprising a reference electrode in contact with the electrolyte solution.

17. The electrochemical cell of claim 15, wherein the electrolyte solution comprises water and an inorganic base at a concentration of 0.05-0.4 M.

18. The electrochemical cell of claim 17, wherein the carbon-supported $Co_3O_4$ electrode has a current density of 30-45 mA/$cm^2$ when the electrodes are subjected to a potential of 1.3-1.8 V.

19. A method for decomposing water into $H_2$ and $O_2$, the method comprising:
subjecting the electrodes of the electrochemical cell of claim 17 with a potential of 0.5-2.0 V.

20. The method of claim 19, further comprising separately collecting $H_2$-enriched gas and $O_2$-enriched gas.

* * * * *